(12) United States Patent
Gröndal et al.

(10) Patent No.: US 9,356,976 B2
(45) Date of Patent: *May 31, 2016

(54) REAL-TIME COMMUNICATIONS METHODS PROVIDING PAUSE AND RESUME AND RELATED DEVICES

(71) Applicant: Telefonaktiebolaget L M Ericsson (publ), Stockholm (SE)

(72) Inventors: Eric Daniel Gröndal, Knivsta (SE); Muhammad Azam Akram, Stockholm (SE); Bo Burman, Upplands Väsby (SE); Magnus Westerlund, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/885,221

(22) Filed: Oct. 16, 2015

(65) Prior Publication Data

US 2016/0088029 A1 Mar. 24, 2016

Related U.S. Application Data

(63) Continuation of application No. 14/351,088, filed as application No. PCT/IB2012/000204 on Feb. 6, 2012, now Pat. No. 9,185,346.

(60) Provisional application No. 61/549,947, filed on Oct. 21, 2011.

(51) Int. Cl.
*H04N 7/14* (2006.01)
*H04L 29/06* (2006.01)
*H04N 7/15* (2006.01)

(52) U.S. Cl.
CPC .......... *H04L 65/1083* (2013.01); *H04L 65/403* (2013.01); *H04N 7/15* (2013.01)

(58) Field of Classification Search
CPC ...................................................... H04N 7/14
USPC .................. 348/14.01, 14.08, 14.12
See application file for complete search history.

(56) References Cited

U.S. PATENT DOCUMENTS

| 5,987,621 A | 11/1999 | Duso et al. |
| 2004/0008635 A1 | 1/2004 | Nelson et al. |

(Continued)

FOREIGN PATENT DOCUMENTS

| WO | WO 2011/043886 A1 | 4/2011 |
| WO | WO 2013/057548 A1 | 4/2013 |

OTHER PUBLICATIONS

International Search Report for PCT Application No. PCT/IB2012/000204, mailed May 24, 2012, 5 pages.

(Continued)

*Primary Examiner* — Olisa Anwah
(74) *Attorney, Agent, or Firm* — Myers Bigel & Sibley, P.A.

(57) ABSTRACT

Operating a receiver communication device during a real time communication session including a real time media content data stream provided by another communication device may include receiving the real time media content data stream of the communication session from the other communication device wherein packets of the real time media content data stream include an identification of the real time media content data stream. A pause request may be transmitted from the receiver communication device to the other communication device with the pause request including the identification of the real time media content data stream and a pause request sequence number. After transmitting the pause request, a pause acknowledge message may be received from the other communication device with the pause acknowledge message including the identification of the real time media content data stream and the pause request sequence number. Related devices and methods are also discussed.

26 Claims, 8 Drawing Sheets

```
      0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                    SSRC to Apply Message                      |
+-+-+-+-+-+-+-+-+-+-+-+-+-+-+-+-+-+-+-+-+-+-+-+-+-+-+-+-+-+-+-+-+
|      Sequence Number          | Type  |       Reserved        |
+-+-+-+-+-+-+-+-+-+-+-+-+-+-+-+-+-+-+-+-+-+-+-+-+-+-+-+-+-+-+-+-+
```
Syntax of FCI (Feedback Control Information) Entry in the PAUSE and RESUME message.

(56) References Cited

U.S. PATENT DOCUMENTS

| | | | | |
|---|---|---|---|---|
| 2004/0125757 | A1* | 7/2004 | Mela | H04L 29/06027 370/261 |
| 2005/0080849 | A1 | 4/2005 | Wee et al. | |
| 2007/0133523 | A1* | 6/2007 | Kwon | H04L 29/06027 370/356 |
| 2010/0131659 | A1 | 5/2010 | Narayana et al. | |
| 2011/0161836 | A1 | 6/2011 | Mu et al. | |
| 2011/0267419 | A1* | 11/2011 | Quinn | H04N 7/15 348/14.08 |
| 2011/0271002 | A1* | 11/2011 | Martinez | H04L 65/4084 709/231 |

OTHER PUBLICATIONS

Written Opinion of the International Searching Authority for PCT Application No. PCT/IB2012/000204, mailed May 24, 2012, 15 pages.
Second Written Opinion of the International Searching Authority for PCT Application No. PCT/IB2012/000204, mailed Oct. 15, 2013, 9 pages.
International Preliminary Report on Patentability for PCT Application No. PCT/IB2012/000204, mailed Jan. 15, 2014, 26 pages.
Schulzrinne et al.:"Real-Time Streaming Protocol 2.0 (RTSP); draftietf-mmusic-rfc2326bis 27", MMUSIC Working Group, Internet-Draft, Obsoletes: 2326 (if approved), Standards Track; Internet Engineering Task Force, IETF; Standardworkingdraft, Internet Society (ISOC) 4, Rue des Falaises CH- 1205 Geneva, Switzerland, No. 27, Mar. 9, 2011, XP015074524, pp. 1-296.
Schulzrinne et al.: "RTP: A Transport Protocol for Real-Time Applications; rfc3550", Network Working Group, Request for Comments: 3550, Obsoletes: 1889, Standards Track; Jul. 1, 2003, XP015009332, ISSN: 0000-0003; pp. 1-89.
Akram et al.: "RTP Media Stream Pause and Resume; draft-westerlund-avtext-rtp-stream-pause-00", Network Working Group, Internet-Draft; Standards Track; Internet Engineering Task Force, IETF; Standardworkingdraft, Internet Society (ISOC) 4, Rue des Falaises CH- 1205 Geneva, Switzerland, Oct. 24, 2011, XP015078867, pp. 1-26.
Camarillo et al.: "The Binary Floor Control Protocol (BFCP)", Network Working Group, Request for Comments: 4582, Standards Track; Nov. 2006, pp. 1-65.
Andreasen et al.: "Media Gateway Control Protocol (MGCP) Version 1.0" Network Working Group, Request for Comments: 3435, Obsoletes: 2705; Informational; Jan. 2003, pp. 1-210.
Handley et al.: "SDP: Session Description Protocol" Network Working Group, Request for Comments: 4566, Obsoletes: 2327, 3266, Standards Track; Jul. 2006, pp. 1-49.
Camarillo et al.; "The Session Description Protocol (SDP) Grouping Framework" Internet Engineering Task Force (IETF), Request for Comments: 5888, Obsoletes: 3388, Standards Track, ISSN: 2070-1721; Jun. 2010, pp. 1-21.
Grondal et al.: "Media Stream Selection (MESS) draft-westerlund-dispatch-stream-selection-00" Network Working Group, Internet-Draft, Standards Track; Oct. 24, 2011; pp. 1-24.
Lennox et al.: "Mechanisms for Media Source Selection in the Session Description Protocol (SDP) draft-lennox-mmusic-sdp-source-selection-02" MMUSIC Internet-Draft, Standards Track; Oct. 21, 2010, pp. 1-17.
Bradner: "Key words for use in RFCs to Indicate Requirement Levels" Network Working Group, Request for Comments: 2119, BCP: 14, Best Current Practice, Mar. 1997, pp. 1-3.
Rosenberg et al.: "A Session Initiation Protocol (SIP) Event Package for Conference State" Network Working Group, Request for Comments: 4575, Standards Track; Aug. 2006, pp. 1-48.
Lennox et al.: "Source-Specific Media Attributes in the Session Description protocol (SDP)" Network Working Group, Request for Comments: 5576, Standards Track; Jun. 2009, pp. 1-18.
Levin et al.: "The Session Description Protocol (SDP) Label Attribute" Network Working Group, Request for Comments: 4574, Standards Track; Aug. 2006, pp. 1-8.
Camarillo: "Session Description Protocol (SDP) Format for Binary Floor Control Protocol (BFCP) Streams" Network Working Group, Request for Comments: 4583, Standards Track; Nov. 2006, pp. 1-12.
Westerlund et al.: "RTP Topologies" Network Working Group, Request for Comments: 5117, Informational; Jan. 2008, pp. 1-21.
Zhu et al.: "Public Key Cryptography for Initial Authentication in Kerberos (PKINIT)" Network Working Group, Request for Comments: 4556, Standards Track; Jun. 2006, pp. 1-42.
Crocker et al.: "Augmented BNF for Syntax Specifications: ABNF" Network Working Group, Request for Comments: 5234, STD: 68, Obsoletes: 4234; Standards Track; Jan. 2008, pp. 1-16.
Ott et al.: "Extended RTP Profile for Real-time Transport Control protocol (RTCP)—Based Feedback (RTP/AVPF" Network Working Group, Request for Comments: 4585, Standards Track; Jul. 2006, pp. 1-51.
Wenger et al.: "Codec Control Messages in the RTP Audio-Visual Profile with Feedback (AVPF)" Network Working Group, Request for Comments: 5104, Standards Track; Feb. 2008, pp. 1-64.

* cited by examiner

Pause and resume operations in Point-to-Point embodiments.

Pause and resume operations with PAUSE lost.

The pause request is refused in Point-to-Point scenario.

Pause and resume operations between two participant endpoint devices using a mixer.

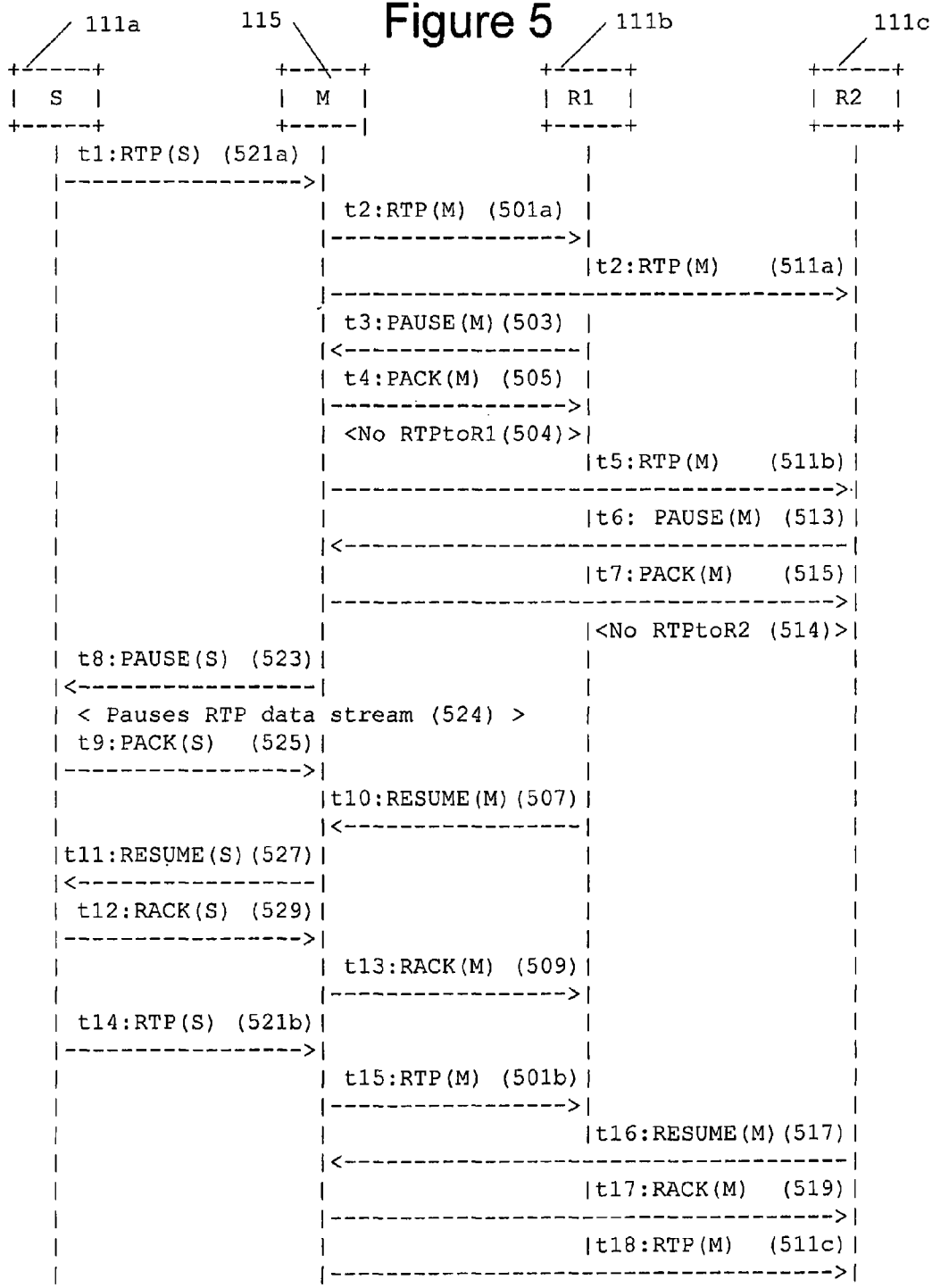
Pause and resume operations between one sender endpoint device and two receiver endpoint devices using a mixer.

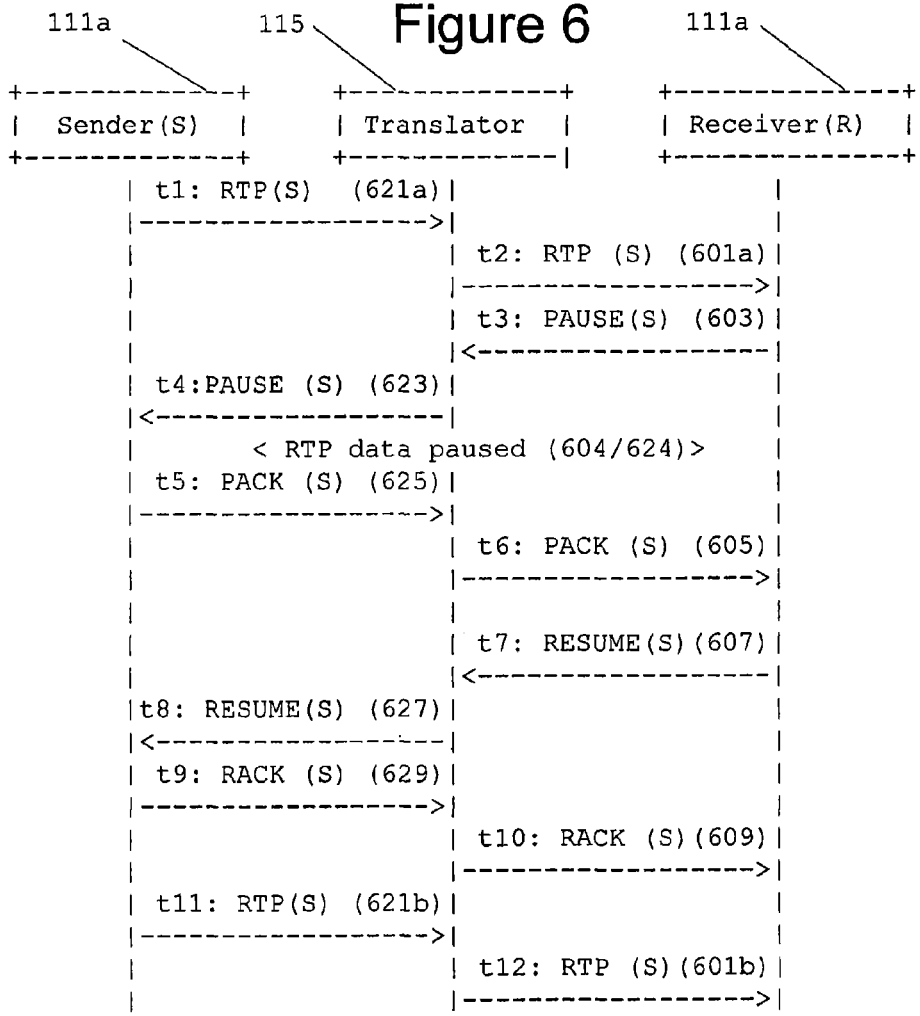
Pause and resume operations between two participant endpoint devices are shown using a Translator.
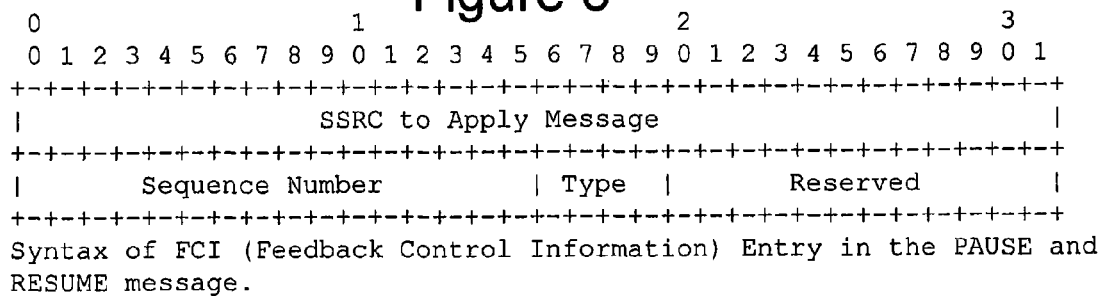
Syntax of FCI (Feedback Control Information) Entry in the PAUSE and RESUME message.

Pause and resume operations between one sender endpoint device and two receiver endpoint devices through a translator.

REAL-TIME COMMUNICATIONS METHODS PROVIDING PAUSE AND RESUME AND RELATED DEVICES

CROSS REFERENCE TO RELATED APPLICATIONS

This application claims the benefit of priority as a continuation of U.S. application Ser. No. 14/351,088, filed on Apr. 10, 2014, which is a 35 U.S.C. §371 national stage application of PCT International Application No. PCT/IB2012/000204, filed on 6 Feb. 2012, which itself claims the benefit of U.S. provisional Patent Application No. 61/549,947, filed 21 Oct. 2011. The disclosures and contents of all of the above referenced applications are incorporated by reference herein in their entirety. The above-referenced PCT International Application was published in the English language as International Publication No. WO 2013/057548 A1 on 25 Apr. 2013.

TECHNICAL FIELD

The present invention relates to communications systems and, more particularly, to systems and methods providing streaming communications.

BACKGROUND

Multimedia conferencing may allow real time streaming between two or more endpoint devices over a network such as the Internet to provide real time communications. Each of a plurality of endpoint devices participating in a video conference session, for example, may generate a multimedia content data stream including video and audio content, and a central communication node may select a content data stream or streams that is/are provided to each of the endpoint devices. A communication node, for example, may select a content data stream based on a comparison of audio content/volume associated with each of the content data streams. Stated in other words, the communication node may attempt to select a content data stream corresponding to a speaker that is currently most active in the conference call. In such an implementation, however, selection of a content data stream may be undesirably biased toward an endpoint device generating the greatest audio volume, for example, due to undesired noise.

Accordingly, there continues to exist a need in the art for improved selection of content data streams in communication environments such as multimedia conferencing.

SUMMARY

It is therefore an object to address at least some of the above mentioned disadvantages and/or to improve performance in a communication system.

According to some embodiments of the present invention, a receiver communication device may receive a real time media content data stream provided by another communication device during a real time communication session. A method of operating such a receiver communication device may include receiving the real time media content data stream of the communication session from the other communication device with packets of the real time media content data stream including an identification of the real time media content data stream. Moreover, a pause request may be transmitted from the receiver communication device to the other communication device with the pause request including the identification of the real time media content data stream and a pause request sequence number.

After transmitting the pause request, receiving, a pause acknowledge message may be received from the other communication device with the pause acknowledge message including the identification of the real time media content data stream and the pause request sequence number. After receiving the pause acknowledge message, a resume request may be transmitted from the receiver communication device to the other communication device with the resume request including the identification of the real time media content data stream and a resume request sequence number different than the pause request sequence number. After transmitting the resume request, a resume acknowledge message may be received from the other communication device with the resume acknowledge message including the identification of the real time media content data stream and the resume request sequence number. Moreover, the resume request sequence number may be incremented relative to the pause request sequence number such that the pause and resume sequence numbers are selected from the same sequence number space.

The pause request may be a first pause request, and the pause request sequence number may be a first pause request sequence number. A second pause request may then be transmitted from the receiver communication device to the other communication device responsive expiration of a time out after transmitting the pause request from the receiver communication device with the second pause request including the identification of the real time media content data stream and a second pause request sequence number different than the first pause request sequence number. After transmitting the second pause request, a pause acknowledge message may be received from the other communication device with the pause acknowledge message including the identification of the real time media content data stream and the second pause request sequence number. More particularly, the second pause request sequence number may be incremented relative to the first pause request sequence number such that the first and second pause request sequence numbers are selected from the same sequence number space.

The identification of the real time media content data stream may be a synchronization source (SSRC) that uniquely identifies the real time media content data stream within the real time communication session.

According to other embodiments of the present invention, a sender communication device may provide a real time communication session with another communication device. A method of operating such a sender communication device may include transmitting a real time media content data stream of the communication session from the sender communication device to another communication device with packets of the real time media content data stream including an identification of the real time media content data stream. A pause request may be received from the other communication device with the pause request including the identification of the real time media content data stream and a pause request sequence number.

Responsive to receiving the pause request, transmission of the real time media content data stream of the communication session may be paused while maintaining the communication session. Responsive to receiving the pause request, a pause acknowledge message may be transmitted to the other communication device with the pause acknowledge message including the identification of the real time media content data stream and the pause request sequence number. After transmitting the pause acknowledge message, a resume request may be received from the other communication device with the resume request including the identification of the real time media content data stream and a resume request sequence number different than the pause request sequence number. Responsive to receiving the resume request, resuming transmission of the real time media content data stream of the communication session may be resumed.

Responsive to receiving the resume request, a resume acknowledge message may be transmitted to the other communication device with the resume acknowledge message including the identification of the real time media content data stream and the resume request sequence number. Moreover, the resume request sequence number is incremented relative to the pause request sequence number such that the pause and resume request sequence numbers are selected from the same sequence number space.

Responsive to receiving the pause request, a refuse message may be transmitted to the other communication device while continuing transmitting the real time media content data stream to the other communication device with the refuse message including the identification of the real time media content data stream and the pause request sequence number.

Responsive to receiving the pause request, a negative-acknowledge (NACK) message may be transmitted to the other communication device while continuing transmitting the real time media content data stream to the other communication device, with the negative-acknowledge message including the identification of the real time media content data stream and the pause request sequence number.

Moreover, the identification of the real time media content data stream may include a synchronization source (SSRC) that uniquely identifies the real time media content data stream within the real time communication session.

According to still other embodiments of the present invention, a receiver communication device may include a network interface and a processor coupled to the network interface. The network interface may be configured to provide network communications over a network with another communication device during a real time communication session. The processor may be configured to receive a real time media content data stream of the real time communication session from the other communication device through the network interface with packets of the real time media content data stream including an identification of the real time media content data stream. The processor may be further configured to transmit a pause request through the network interface to the other communication device with the pause request including the identification of the real time media content data stream and a pause request sequence number.

The processor may be further configured to receive a pause acknowledge message from the other communication device after transmitting the pause request with the pause acknowledge message including the identification of the real time media content data stream and the pause request sequence number. Moreover, the processor may be configured to transmit a resume request through the network interface to the other communication device after receiving the pause acknowledge message wherein the resume request includes the identification of the real time media content data stream and a resume request sequence number different than the pause request sequence number. The processor may also be configured to receive a resume acknowledge message from the other communication device through the network interface after transmitting the resume request with the resume acknowledge message including the identification of the real time media content data stream and the resume request sequence number. The resume request sequence number may be incremented relative to the pause request sequence number such that the pause and resume request sequence numbers are selected from the same sequence number space.

The pause request may be a first pause request, and the pause request sequence number may be a first pause request sequence number. Moreover, the processor may be further configured to transmit a second pause request through the network interface to the other communication device responsive expiration of a time out after transmitting the first pause request with the second pause request including the identification of the real time media content data stream and a second pause request sequence number different than the first pause request sequence number. The processor may be further configured to receive a pause acknowledge message from the other communication device through the network interface after transmitting the second pause request with the pause acknowledge message including the identification of the real time media content data stream and the second pause request sequence number.

The second pause request sequence number may be incremented relative to the first pause request sequence number such that the first and second pause request sequence numbers are selected from the same sequence number space.

Moreover, the identification of the real time media content data stream may be a synchronization source (SSRC) that uniquely identifies the real time media content data stream within the real time communication session.

According to yet other embodiments of the present invention, a sender communication device may include a network interface and a processor coupled to the network interface. The network interface may be configured to provide network communications over a network with another communication device during a real time communication session. The processor may be configured to transmit a real time media content data stream of the communication session through the network interface to the other communication device with packets of the real time media content data stream including an identification of the real time media content data stream. The processor may be further configured to receive a pause request from the other communication device through the network interface with the pause request including the identification of the real time media content data stream and a pause request sequence number.

The processor may be further configured to pause transmission of the real time media content data stream of the communication session while maintaining the communication session responsive to receiving the pause request, and to transmit a pause acknowledge message to the other communication device through the network interface responsive to receiving the pause request with the pause acknowledge message including the identification of the real time media content data stream and the pause request sequence number. The processor may be further configured to receive a resume request from the other communication device through the network interface after transmitting the pause acknowledge message with the resume request including the identification of the real time media content data stream and a resume request sequence number different than the pause request sequence number. Responsive to receiving the resume request, the processor may be configured to resume transmission of the real time media content data stream of the communication session and to transmit a resume acknowledge message to the other communication device through the network interface, with the resume acknowledge message including the identification of the real time media content data stream and the resume request sequence number. Moreover, the resume request sequence number may be incremented relative to the pause request sequence number such that the pause and resume request sequence numbers are selected from the same sequence number space.

The processor may be further configured to transmit a refuse message to the other communication device through the network interface responsive to receiving the pause request while continuing transmitting the real time media content data stream to the other communication device, with the refuse message including the identification of the real time media content data stream and the pause request sequence number.

The processor may be further configured to transmit a negative-acknowledge (NACK) message to the other communication device through the network interface responsive to the pause request while continuing transmitting the real time media content data stream to the other communication device, with the negative-acknowledge message including the identification of the real time media content data stream and the pause request sequence number.

Moreover, the identification of the real time media content data stream may include a synchronization source (SSRC) that uniquely identifies the real time media content data stream within the real time communication session.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 1-7 are flow diagrams illustrating pause and resume operations according to some embodiments disclosed herein;

FIG. 8 is a diagram illustrating a feedback message format relating to pause and resume operations according to some embodiments disclosed herein;

DETAILED DESCRIPTION

Figure 1:
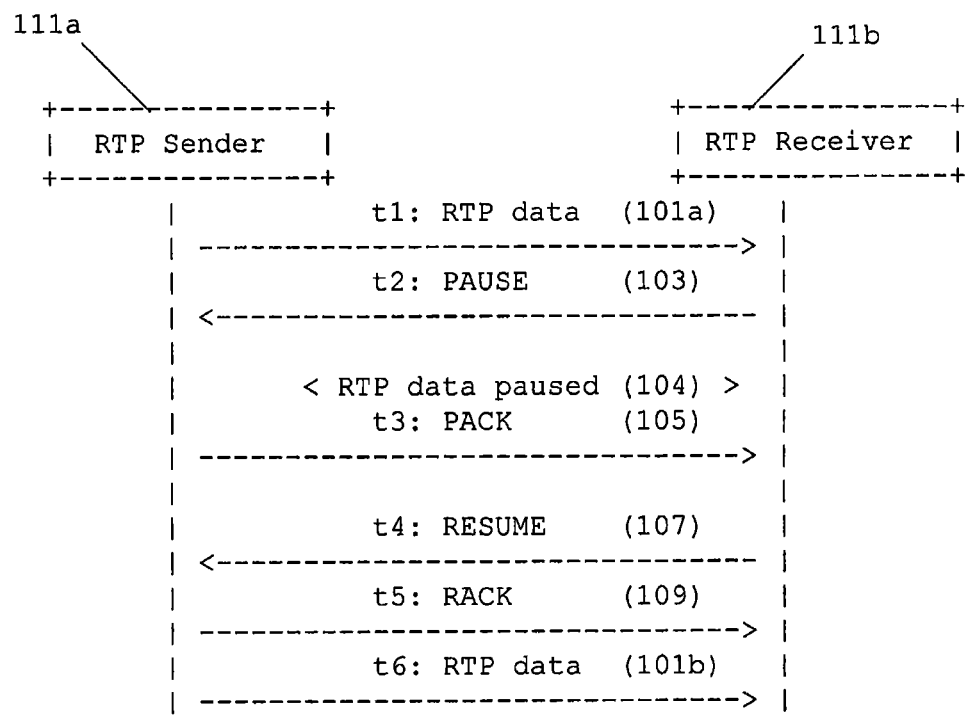

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Moreover, the terms "must", "must not", "required", "shall", "shall not", "should", "should not", "recommended", "may", and "optional" may be used herein with respect to particular embodiments without limiting the scope of the present invention. Stated in other words by way of example, an element(s), operation(s), step(s), etc., may be required with respect to a particular embodiment without being required for all embodiments. Accordingly, these terms should not be considered limiting with respect to the present application and claims omitting the referenced element(s), operation(s), step(s), etc. Moreover, to the extent that terms such as "must", "must not", "required", "shall", "shall not", "should", "should not", "recommended", "may", and "optional" are used in the following disclosure, these terms may be interpreted in accordance with RFC (Request For Comments) 2119 by S. Bradner and entitled "Key words for use in RFCs to Indicate Requirement Levels" (BCP 14, RFC 2119, March 1997). In addition to definitions provided in the present disclosure, definitions may also be applied from reference RFC 3550 by H. Schulzrinne, et al. and entitled "RTP: A Transport Protocol for Real-Time Applications" (STD 64, RFC 3550, July 2003); reference RFC 4585 by J. Ott, et al. and entitled "Extended RTP Profile for Real-time Transport Control Protocol (RTCP)-Based Feedback (RTP/AVPF)" (RFC 4585, July 2006); and/or reference RFC 5104 by S. Wenger, et al, and entitled "Codec Control Messages in the RTP Audio-Visual Profile with Feedback (AVPF)" (RFC 5104, February 2008).

With the increased popularity of real-time multimedia applications, users may demand more control over communication sessions. Embodiments of this disclosure may provide a receiver endpoint device in a multimedia conversation/communication that can pause and/or resume an incoming data stream(s) from a sender endpoint device(s) by sending real-time feedback messages. Real-time Transport Control Protocol (RTCP) is a sister protocol of Real-time Transport Protocol (RTP) which is widely used for real time data transport. RTP sender and receiver endpoint devices, however, may use RTCP to report the transmission and reception statistics at regular intervals. Embodiments of this disclosure may extend Code Control Messages (CCMs) (see, RFC 5104, cited above) by adding two new real-time feedback messages which are to be sent from the receiver endpoint device to the sender endpoint device to pause and resume RTP data streams.

As real-time communications attract more users, more applications such as multimedia conversation applications are being developed. Multimedia conversation applications may exist in forms such as peer-to-peer chat applications and multiparty video conferencing applications controlled by a Multipoint Control Unit (MCU).

Video conferencing may involve many participants with each participant having its own preferences and demands for control over the communication session both from the start of the communication session and also during the session. Embodiments of this disclosure may provide multimedia communications where a participant may choose to temporarily pause an incoming data stream from a specific sources(s) and resume the data stream when desired/needed. The receiver endpoint device does not need to terminate the communication session from the source(s) of the paused data stream and start over again by negotiating new communication session parameters, for example, by exchanging the SDP (Session Description Protocol). In contrast, if the communication session is terminated, the receiver and/or sender endpoint device may need to establish a new communication session, which may include negotiating new communication session parameters by exchanging the SDP.

As used herein, the term media content data stream (or data stream) refers to media (e.g., a video and/or audio media content data stream) being sent from one specific media capture device (such as a microphone for audio media and/or a video camera for video media) at an endpoint communication device. The term endpoint device (also referred to as an endpoint) refers to a communication device that handles media by originating one or more media content data streams (e.g., originating audio and/or video streams using a microphone and/or video camera) and/or terminating one or more media content data streams (e.g., generating audio and/or video output) received from one or more other endpoint devices. Moreover, each endpoint device of a communication session may be both a sender endpoint device generating one or more media content data streams for presentation of other endpoint devices (acting as receiver endpoint devices) of the communication session and a receiver endpoint device providing/rendering audio/video output responsive to one or more media content data streams of another endpoint device(s) (acting as a sender endpoint device) of the communication session. By way of example, an RTP (Real-time Transport Protocol) Mixer may be considered as an endpoint.

Figure 9:
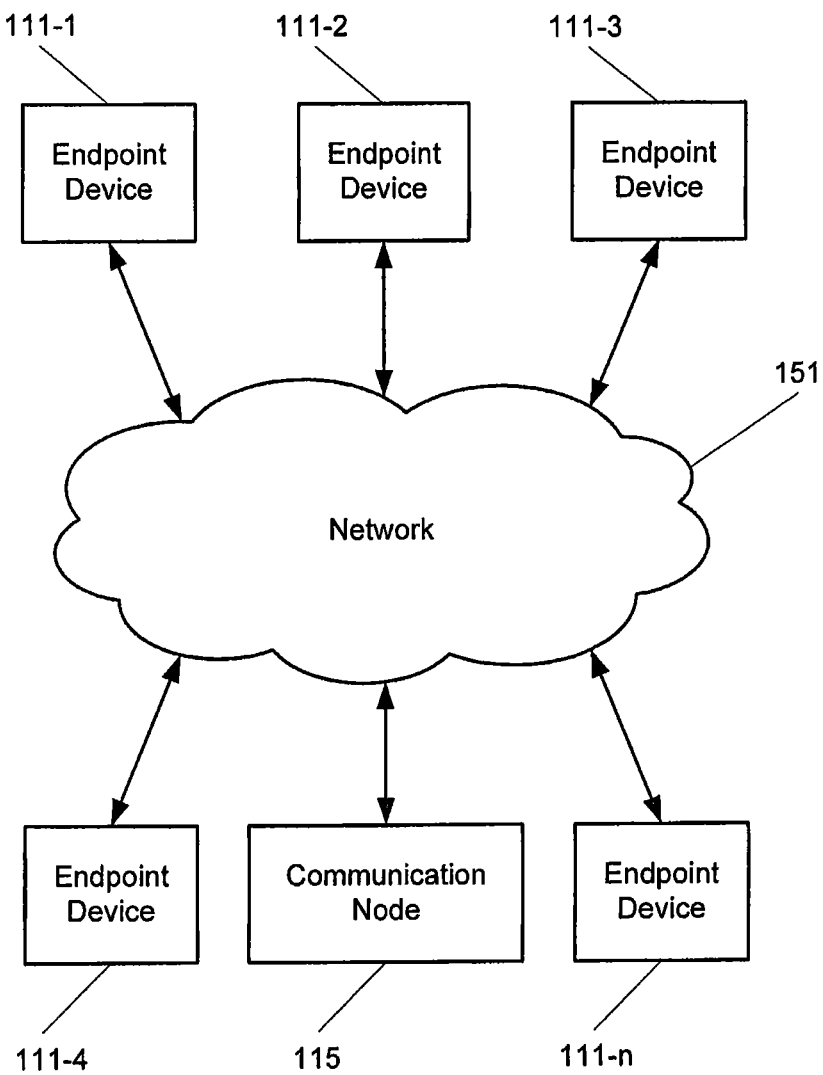
FIG. 9 is a schematic diagram illustrating a plurality of endpoint devices and a communication node communicating through a network according to some embodiments.

FIG. 9 is a schematic diagram illustrating a plurality of endpoint devices 111-1 to 111-n participating in a data streaming communication session (such as a video conferencing session) through network 151 (e.g., the Internet) and communication node 115 according to some embodiments. While at least five endpoint devices 111 are shown in FIG. 9 by way of example, embodiments of the present invention may be implemented using any number of two or more endpoint devices. Once a video conference has been established, each endpoint device 111 may generate a media content data stream (including audio and video), and the respective media content data streams from all endpoint devices 111 may be transmitted to communication node 115 (e.g., implemented as a mixer or a translator) through network 151. For each receiving endpoint device 111, communication node 115 may then select a media content data stream or streams, and the selected media content data stream or streams may then be forwarded from the communication node 115 through network 151 to the respective endpoint nodes 111. More particularly, communication node 115 may select a media content data stream to be sent to a respective endpoint device 111 responsive to input from the respective endpoint device 111. Stated in otherwords, each endpoint device 111 may select the media content data stream to be presented at that endpoint device 111. While a central communication node 115 (such as a mixer or translator) is shown by way of example, other embodiments may be implemented (e.g., in a point-to-point communication session) with two endpoint devices 111 communicating directly with each other through network 151.

Figure 10:
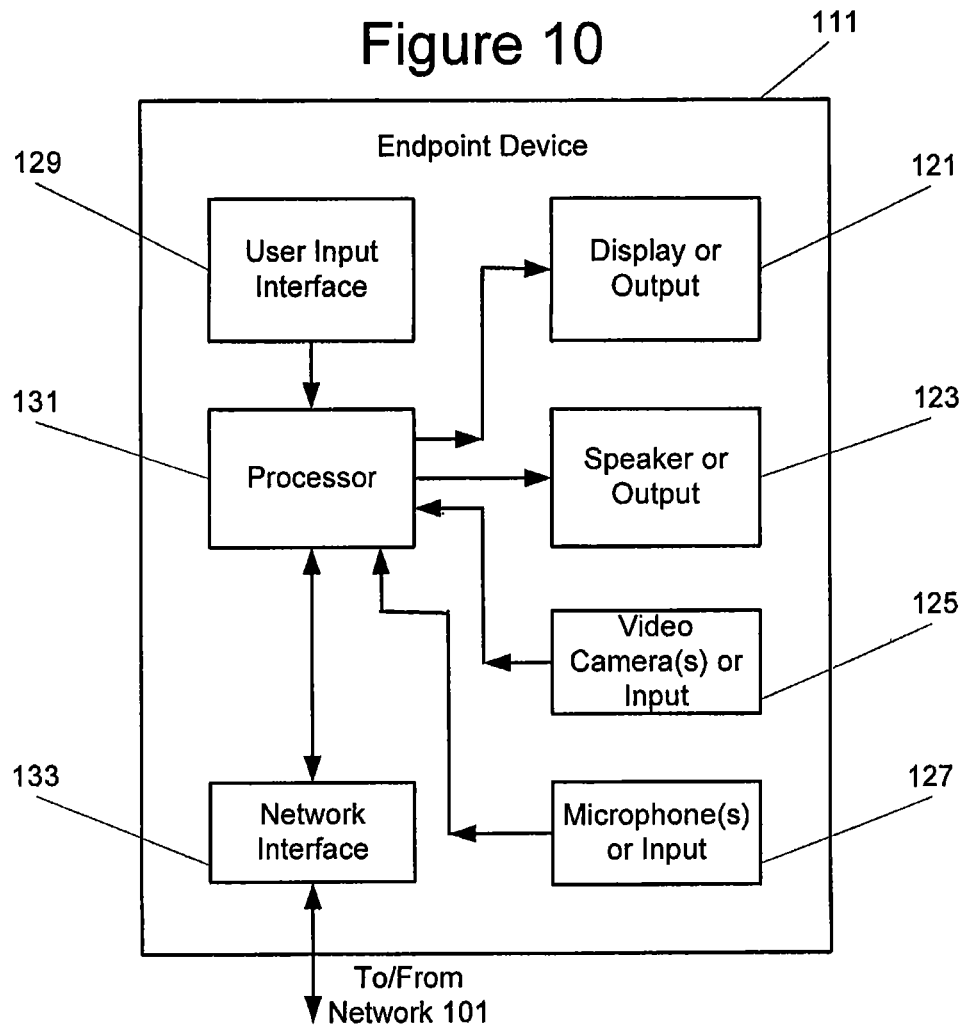
FIG. 10 is a block diagram illustrating an endpoint device of FIG. 9 according to some embodiments.

FIG. 10 is a block diagram illustrating an endpoint device 111 of FIG. 9 according to some embodiments. Endpoint device 111, for example, may include processor 131 coupled to display 121 (e.g., a liquid crystal display screen providing a video output) or display output, user input interface 129 (e.g., including a keypad, a touch sensitive surface of display 121, etc.), speaker 123 or speaker output, one or more video cameras 125 or video camera input(s), and one or more microphones 127 or microphone input(s). In addition, network interface 133 may provide a data/communications coupling between processor 131 and network 151. Endpoint device 111, for example, may be a smartphone, a tablet computer, a netbook computer, a laptop computer, a desktop computer, a stationary video conferencing telephone, or any other device supporting multimedia conferencing. Accordingly, a coupling between network interface 133 and network 151 may be provided over a wireled coupling (e.g., using a digital subscriber line modem, a cable modem, etc.), over a wireless coupling (e.g., over a 3G/40 wireless network, over a WiFi link, etc.), or over a combination thereof.

When implemented as a wireless mobile terminal such as a smartphone, a tablet computer, a netbook computer, or a laptop computer, for example, all elements of FIG. 10 (including a video camera 125 and a microphone 127) may be provided within the housing of the mobile terminal. In such a mobile terminal, the built-in video camera and/or microphone may provide one media content data stream, and video/audio output may be provided using a built-in speaker and display. In other embodiments, endpoint device 111 may not include a built-in video camera, microphone, speaker, and/or display. Instead, such a device may include inputs for one or more external video cameras and/or microphones and outputs for one or more displays and/or speakers. With a video conferencing system for a larger conference room setting, for example, a plurality of external cameras and associated microphones may be positioned around the conference room and coupled to processor 131 through video/microphone inputs 125/127, and display and speaker outputs may be coupled to an external display/speaker (e.g., a large screen display, a projection display, etc.). An endpoint device 111 may thus provide one or more media content data streams responsive to one or more video/microphone pairs, if an endpoint device provides more than one media content data stream, each media content data stream may be separately identified for selection by other endpoint devices involved in the communication session.

As discussed in greater detail below, each endpoint device ill may also provide/render one or more media content data streams of the communication session through display/speaker 121 and 123 (and/or through an external display/speaker), and each endpoint device 111 acting as a receiver endpoint device may dynamically pause and/or resume one or more of the media content data streams of the communication session that is/are to be provided/rendered during the communication session. A sender endpoint device generating a data stream that has been paused by a respective receiver endpoint device may pause the data stream if no other receiver endpoint devices are still using the data stream. Moreover, a sender endpoint device may resume sending a paused data stream responsive to any receiver endpoint device requesting to resume the data stream. In an endpoint device 111, such as a smartphone, with a limited display size, a single media content data stream of the communication session may be selected at any time. When a larger display is provided (e.g., with a desk top computer, an external display, etc.), multiple media content data streams may be selected at any time.

Figure 11:
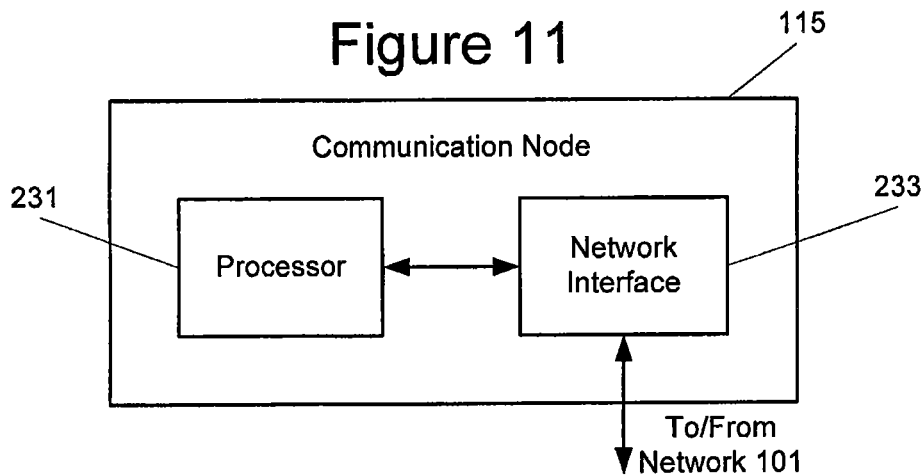
FIG. 11 is a block diagram illustrating a communication node of FIG. 9 according to some embodiments.

FIG. 11 is a block diagram illustrating a communication node 115 of FIG. 9 (also referred to as a conferencing node) according to some embodiments. As shown in FIG. 11, communication node 115 may include processor 231 and network interface 133, with network interface 133 providing a data/communications coupling between processor 231 and network 151. Processor 231 may thus receive one or more media content data streams from each endpoint device 111 involved in a communication session, and processor 231 may forward one or more of the content data streams to one or more of the endpoint devices responsive to dynamic pause and/or resume commands from the respective endpoint devices acting as receiver endpoint devices, and/or processor 231 may pause and/or resume data streams received from endpoint devices acting as sender endpoint devices responsive to pause and/or resume commands received from endpoint devices acting as receiver endpoint devices.

Many real-time applications use RTP (Real-time Transport Protocol) (see, RFC 3550, cited above) for transport. RTP works together with RTCP (Real-time Transport Control Protocol) (see, RFC 3550, cited above), which is responsible for exchanging control information during a communication session. Using RTCP, each endpoint device 111 may exchange feedback reports about transmission and reception quality. Current RTCP feedback messages may not support pausing and resuming an incoming data stream. Moreover, the exchange of regular RTCP feedback reports may follow a specific periodic pattern, such that each sender endpoint device, receiver endpoint device, and/or communication node transmits these reports at specific intervals.

CCMs (Codec Control Messages) (see, RFC5104, cited above) may extend AVPF (Audio-Visual Profile With Feedback) (see, RFC4585, cited above) by adding additional feedback messages, which may lose their purpose if sent with regular RTCP reports (e.g., if immediate transmission is required). Embodiments of this disclosure may extend CCMs by introducing two new real-time. RTCP feedback messages, referred to as PAUSE and RESUME requests. A PAUSE request may/shall be transmitted from a receiver endpoint device 111 to a sender endpoint device to pause an RTP stream and a RESUME request may/shall be sent in the same direction to resume the previously paused data stream. A receiver endpoint device 111 may/shall specify an SSRC (Synchronization Source) as an identification of the source (e.g., sender endpoint device 111 and/or communication node 115) in the PAUSE and/or RESUME requests. Although the PAUSE and RESUME requests may be real-time feedback messages, embodiments discussed herein do not forbid sending PAUSE and RESUME requests in a regular compound RTCP report, if/when the time to send a PAUSE or RESUME message matches with a regular RTCP report transmit time.

As RTP does not guarantee reliable data transmission, a receiving endpoint device 111 (i.e., an endpoint device that receives a data stream and transmits a PAUSE/RESUME message) may expect acknowledgement from the sender endpoint device 111 (i.e., an endpoint device that transmits the data stream and receives the PAUSE/RESUME message) or from the communication node 115 to be assured that the previously transmitted PAUSE or RESUME message reaches the destination (i.e., the sender endpoint device 111 or communication node 115). This disclosure further defines four different types of response/acknowledgement from the RTP sender endpoint device to the receiver endpoint device, in the section below labeled "Message Acknowledgements".

A receiver endpoint device 111 (or a user thereof) may select to pause the data stream from a particular RTP sender endpoint device 111 due to various reasons such as:
  A receiver endpoint device 111 (or a user thereof) in a multiparty video conference may choose to receive data streams only from a selected source or sources (Le from selected sender endpoint devices 111) due to network congestion;
  A receiver endpoint device 111 (or a user thereof) in a multiparty video conference may choose to pause a data stream from an RTP sender endpoint device 111 that is subject to excessive noise (e.g., when the sender endpoint device 111 is in a noisy room);
  A receiver endpoint device (or a user thereof) may pause a data stream from a sender endpoint device that is subject to an internal system problem until the problem has been resolved; and/or
  A user of a receiver endpoint device 111 may pause a data stream from a sender endpoint device 111 because the user thinks that a participant(s) using the sender endpoint device 111 does not contribute significantly to the conference for certain time.

Feedback Messages:
The CCM (Codec Control Message) (see, RFC 5104, cited above) categorizes different RTCP (Real-time Transport Control Protocol) feedback messages into four types: Request. Command, Indication, and Notification. Embodiments of the present disclosure may place the PAUSE and RESUME messages in the Request category because acknowledgements may be desired/required for PAUSE and RESUME messages.

An acknowledgement is a confirmation from the endpoint device 111 or communication node 115 receiving the PAUSE/RESUME message (i.e., the endpoint device generating/sending the data stream being paused/resumed) to the endpoint device 111 that transmitted the PAUSE/RESUME message (i.e., the endpoint device receiving the data stream being paused/resumed) confirming receipt of the PAUSE/RESUME message.

A sender endpoint device 111 is an RTP (Real-time Transport Protocol) entity that generates/sends an RTP data stream, and a sender endpoint device can also be a receiver endpoint device in the same communication session.

A receiver endpoint device 111 is an RTP entity which receives the RTP data stream from the sender endpoint device 111, and a receiver endpoint device can also be a sender endpoint device in the same communication session.

A mixer is an intermediate RTP node (e.g., communication node 115) which receives data streams from different nodes (e.g., from different sender endpoint devices 111), combines the data streams to generate one data stream and forwards the one data stream to destinations (e.g., to different receiver endpoint devices).

A participant endpoint device is a member taking part in a multimedia conversation communication session.

A paused sender is an RTP sender endpoint device that receives a PAUSE request from all other participant endpoint devices in a communication session and stops/pauses its transmission over any given time period during which no other participant endpoint device receives its transmission.

A pausing receiver is an RTP receiver endpoint device which sends a PAUSE request to another participant(s).

Possible reasons that a receiver endpoint device 111 may pause an RTP sender endpoint device 111 are discussed above. Pausing and resuming may be time-dependent such that a receiver endpoint device 111 may choose to pause an RTP data stream of a sender endpoint device 111 for a certain duration after which the receiver endpoint device 111 may want to resume receiving the RTP stream from the sender endpoint device 111. This time dependency may mean that messages related to pause and resume operations may/must be transmitted to the sender endpoint device 111 in real-time in order to provide the intended purpose.

Message Direction:
It may/must be a responsibility of a receiver endpoint device 111 that wants to pause or resume a data stream from a sender endpoint device(s) 111 to transmit PAUSE and RESUME messages. A sender endpoint device may be unable to pause/resume itself without receiving a PAUSE/RESUME message from another device.

Apply on SSRC (Synchronization Source):
The PAUSE and RESUME messages may/shall be applied on an SSRC of an RTP sender endpoint device 111, which means that the receiver endpoint device 111 may include the SSRC of the sender endpoint device 111 in the PAUSE and RESUME requests. If a mixer (e.g., implemented in communication node 115) is involved between the sender and the receiver endpoint devices 111, the pausing or resuming receiver endpoint device 111 may specify an SSRC of the mixer.

Acknowledgements:
RTP does not guarantee a reliable data transmission. RTP instead depends on lower layer protocols for this purpose. It is possible that a PAUSE and/or RESUME message transmitted from an RTP receiver endpoint device 111 may not reach its destination, i.e. an RTP sender endpoint device 111. Similarly it may also be possible that a PAUSE or RESUME message does reach an RTP sender endpoint device 111 but for some reasons the sender endpoint device 111 does not respond by pausing or resuming the stream. Instead, the sender endpoint device 111 may wait for requests from other receiver endpoint devices 111 as well (as discussed below in the section "Message Acknowledgements"). In that case, an RTP receiver endpoint device 111 may assume that a previous PAUSE or RESUME message was lost, and the receiver endpoint device 111 may falsely retransmit it. In order to reduce/avoid this condition, an RTP source (i.e., RTP sender endpoint device 111 or communication node 115) may/shall said an acknowledgement in response to each PAUSE and RESUME message. The section "Message Acknowledgements" of this disclosure (provided below) describes different types of acknowledgements for PAUSE and RESUME messages.

Time-Out Value:

The section "Acknowledgements" (above) describes that an RTP receiver endpoint device 111 may expect an acknowledgement from the sender endpoint device 111 or conference node 115 for each PAUSE and RESUME message that is sent from the receiver endpoint device 111 to the sender endpoint device 111 or conference node 115. If a receiver endpoint device 111 does not receive an acknowledgement within a time-out period defined by the time-out value, the receiver endpoint device 111 may retransmit the PAUSE/RESUME message until the receiver endpoint device 111 either receives an acknowledgement from the sender endpoint device 111 or conference node 115 or observes the requested behavior from the sender endpoint device or conference node, i.e. that either the data stream from the sender endpoint device or conference node is paused or resumed).

After sending a PAUSE or RESUME message, the RTP receiver endpoint device 111 may start a timer. If the receiver endpoint device 111 does not receive any acknowledgement or detect the expected change in behavior before the timer expires, the receiver endpoint device 111 may retransmits the PAUSE or RESUME message and restart the timer. On detecting the expected change in behavior or on receiving the acknowledgment, the RTP receiver endpoint device 111 may/shall stop retransmitting the PAUSE or RESUME message. The time-out value may/shall be determined by normal RTCP bandwidth and timing rules applicable to the communication session (section 6.2 of RFC 3550, cited above).

Sequence Numbering:

Every PAUSE and RESUME message may/must have a unique sequence number which may/must be incremented by one every time a PAUSE/RESUME message is transmitted from a receiver endpoint device 111. The PAUSE and RESUME messages transmitted by a same receiver endpoint device 111 may/shall share the same sequence number space. If an RTP sender endpoint device ill receives multiple PAUSE and/or RESUME messages from a same receiver endpoint device, the sender endpoint device may/must follow the higher sequence numbered message. An advantage of using a same sequence number space is to avoid ambiguity to the sender endpoint device of which PAUSE/RESUME message to follow in case of retransmission(s). For example, if an RTP sender endpoint device receives both PAUSE and RESUME messages from the same receiver endpoint device at or about the same time (e.g., due to late packet arrival or any other reason), before deciding which message to respond to, the sender endpoint device may/must follow the message with higher sequence number. Each acknowledgement may/must have the same sequence number as in the message (PAUSE or RESUME) to which it is responding.

Participants States:

This disclosure introduces two new states of an RTP sender endpoint device, i.e. a paused state and a resumed state.

Paused State:

A participant (e.g., a sender endpoint device) may be in a paused state when it pauses its transmission after receiving PAUSE requests from all other participants (e.g., from all other receiver endpoint devices) in the session. A sender endpoint device may thus be in a paused state when no participant is willing to receive its transmission(s). Only an RTP sender endpoint device may/shall be in a paused state. Following sub-sections discuss some potential issues when an RTP sender endpoint device goes into paused state.

RTCP BYE Message:

When a participant endpoint device leaves a communication session, the participant endpoint device may send an RTCP BYE message. In addition to the semantics described in section 6.3.4 and 6.3.7 of RFC 3550 (cited above), the following two conditions also may/must be considered when an RTP participant sends an RTCP BYE message:

If a paused sender sends an RTCP BYE message, no receiver may/shall send further PAUSE or RESUME request to it.

As a sender endpoint device pauses its transmission on receiving PAUSE requests from all receiver endpoint devices in a session, the sender endpoint device may keep a record of all the receiver endpoint devices which do and which do not want to receive its transmission. If a pausing receiver endpoint device sends an RTCP BYE message, the sender endpoint device may/shall not consider that receiver endpoint device when it decides to pause/resume its transmission.

RTCP BYE Message:

These conditions may also be valid if an RTP Translator is used in the communication. But when an RTP Mixer is involved between the participating endpoint devices (where an RTP Mixer forwards the data stream or streams by providing its own SSRC as an identification in the RTP data stream), it may/shall be a responsibility of the Mixer to control sending PAUSE and RESUME requests to the sender endpoint device. The Mixer may/shall not send any PAUSE or RESUME requests to a sender endpoint device which has sent an RTCP BYE message. Similarly, if a pausing receiver endpoint device sends an RTCP BYE Message, the mixer may/shall not consider that receiver when it decides to pause a stream.

SSRC Time-Out:

Section 6.3.5 in RFC 3550 (cited above) describes the SSRC time-out of an RTP participant endpoint device. Every RTP participant endpoint device may maintain sender and receiver endpoint device lists for a communication session. If a participant endpoint device does not get any RTP or RTCP packets from other participant(s) for a last five RTCP reporting Intervals, the participant endpoint device may remove that participant from its receiver endpoint device list. The conditions described above in the section "RTCP BYE Message" regarding an RTCP BYE message may also be valid for the SSRC time-out in both translator and mixer cases.

Resumed State:

An RTP sender endpoint device may change to the Resumed state when it resumes its transmission of its RTP data stream after a paused state. The resumed state refers to a normal RTP sending state such that the RTP sender endpoint device transmits its data stream. A purpose of defining a new "Resumed" state is to describe that the sender endpoint device was previously paused. The sender endpoint device may enter the Resumed state when at least one of the receiver endpoint devices that previously sent a PAUSE request to the sender endpoint device, later sends a RESUME request to the sender endpoint device.

Message Acknowledgements:

Considering that RTP does not guarantee reliable data delivery, an RTP receiver endpoint device may/shall wait for acknowledgement from the sender endpoint device for every sent PAUSE or RESUME request that is sent to the sender endpoint device. If the receiver does not receive any acknowledgement or detect the expected behavior (i.e. paused or resumed data stream transmission) from the sender endpoint device, the receiver endpoint device may/might retransmit the PAUSE or RESUME request. Before retransmission, the receiver endpoint device may/shall wait for a time-out value, which may/shall obey the RTCP timing rules (see, RFC 3550, cited above).

Every acknowledgement may/shall have the same sequence number as the request message (PAUSE or RESUME) it acknowledges. The sender endpoint device may respond to PAUSE or RESUME requests in four different ways: Negative-Acknowledgement (NACK); Pause-Acknowledgement (PACK); Resume-Acknowledgement (RACK); and REFUSE.

Negative-Acknowledgement (NACK):

For a sender endpoint device to pause its transmission, the sender endpoint device may/must receive PAUSE requests from all the corresponding receiver endpoint devices in the communication session.

If N number of participant endpoint devices are in a communication session when one of the participant endpoint devices (acting as a sender endpoint device) receives a PAUSE request from another endpoint device (acting as a receiver endpoint device), the participant endpoint device (acting as the sender endpoint device) that receives the PAUSE request may/must check if it has received PAUSE requests from all of the N−1 other participant endpoint devices (acting as receiver endpoint devices) in the communication session before pausing its data stream. If the number of participant endpoint devices that transmit PAUSE requests is less than N−1, the participant endpoint device receiving the PAUSE request may reply with a NACK to indicate to the requesting endpoint device that even though the PAUSE request has been received, the data stream transmission will not be paused at this stage because there is still at least one receiver endpoint device in the communication session that wants to receive the data stream. The requesting endpoint device does not need to send further PAUSE messages until the sender endpoint device goes into the paused state, but this document does not forbid the receiver endpoint to send further PAUSE or RESUME requests, as it may help the sender endpoint to update the status of that receiver endpoint about its transmission. However in this case the pausing receiver endpoint device may send a RESUME request to the sender endpoint device from which it has previously received an NACK, which may mean that it is no longer interested in pausing that stream. The sender endpoint device then replies with RACK to that receiver as discussed below in the section following the heading "Resume-Acknowledgement."

A NACK may only be sent in response to a PAUSE request. The NACK may/must have the same sequence number as in the PAUSE request that it responds to.

Pause-Acknowledgement (PACK):

When an RTP sender endpoint device receives a PAUSE request from all the corresponding receiver endpoint devices in a communication session, the RTP sender endpoint device sends a Pause-Acknowledgement (PACK) to the receiver endpoint devices that sent PAUSE requests and enters into a Paused state as discussed in above in the section "Participants States". If there are N number of participant endpoint devices in a communication session and the sender endpoint device receives a PAUSE request(s) from N−1th participant, the sender endpoint device pauses its transmission and sends PACK to the all the participant endpoint devices which sent the PAUSE requests. The PACK may be sent in response to a PAUSE request. The PACK may/must contain the same sequence number as in the PAUSE request(s) to which it is responding. For example, once PAUSE requests have been sent to a sender endpoint device from all corresponding receiver endpoint devices of a communication session, the sender endpoint device may send a PACK to each of the sender endpoint devices, and each of these PACKS may include a respective sequence number that is the same as the sequence number of the PAUSE request received from the respective receiver endpoint device.

Resume-Acknowledgement (RACK):

When an RTP sender endpoint device is in Paused state (discussed above in the section "Paused State") and receives a RESUME request from any of the corresponding receiver endpoint devices in a session, the RTP sender endpoint device changes to the Resumed State (discussed above in the section "Resumed State") and replies with Resume-Acknowledgement (RACK) thereby resuming transmission of its data stream to the receiver endpoint device that transmitted the RESUME request.

The RACK may be sent in reply to a RESUME request. The RACK may/must include a sequence number matching the sequence number in RESUME request to which it is responding.

REFUSE:

If any PAUSE and/or RESUME request can not be fulfilled by the sender endpoint device for any reason, the sender endpoint device may reply with a REFUSE acknowledgement. The REFUSE response may be sent in response to PAUSE and/or RESUME requests. The REFUSE may/must contain the same sequence number as in the PAUSE/RESUME request to which it is responding.

Use Cases:

The following are examples of use cases when a sending endpoint device in a communication session may need to used PAUSE and/or RESUME messages:

1. Point-to-Point session;
2. Point-to-multipoint using Mixer;
3. Point-to-multipoint using Translator; and
4. Point-to-multipoint using Multicast.

Point-to-Point Session:

A point-to-point communication session involves two (first and second) participant endpoint devices, each of which acts as a sender and as a receiver endpoint device. Each participant endpoint device acts as a sender endpoint device with respect to the data stream that it generates and/or transmits and as a receiver endpoint device with respect to the data stream that it receives and presents/renders from the other endpoint device.

Either participant endpoint device acting a as receiver endpoint device may transmit PAUSE and RESUME messages to pause/resume data stream transmissions from the other endpoint device (acting as a sender endpoint device). Responsive to a corresponding REP receiver endpoint device sending PAUSE and/or RESUME messages, the corresponding sender endpoint device may pause and/or resume data stream transmission accordingly.

FIG. 1 illustrates pause and resume operations in a Point-to-Point embodiment. At time t1, RTP sender endpoint device 111a may send a data stream (e.g., a content media data stream of a video conference communication session) through network 151 to RTP receiver endpoint device 111b (operation 101a). At time t2, the RTP receiver endpoint device 111b may send a Pause request message (operation 103) to request that the sender endpoint device 111a pause transmitting the data stream. At time t3, sender endpoint device 111a pauses (operation 105) the data stream and replies (operation 105) with a Pause-Acknowledgement (PACK). Sometime later at time t4, receiver endpoint device 111b sends a RESUME request (operation 107) to request that sender endpoint device 111a resume transmitting the paused data stream. In response, sender endpoint device 111a may reply with a Resume Acknowledgement (RACK) message at time t5 (operation 109) and resume its transmission of the REP data stream at time t6 (operation 101b).

In FIG. 1, the same operation number may represent both transmission from one device and reception at another device. Operations 101a and 101 b, for example, may represent transmitting an RTP data stream from sender endpoint device 111a and receiving the REP data stream at receiver endpoint device 111b. Operation 103 may represent transmitting a Pause request message from receiver endpoint device 111b and receiving the Pause request message at sender endpoint device 111a. Operation 105 may represent transmitting a Pause-Acknowledgement (PACK) message from sender endpoint device 111a and receiving the PACK message at receiver endpoint device 111b. Operation 107 may represent transmitting a RESUME request from receiver endpoint device 111b and receiving the RESUME request at sender endpoint device 111a. Operation 109 may represent transmitting a RACK message from sender endpoint device 111a and receiving the RACK message at receiver endpoint device 111b. Stated in other words, numbered operations of FIG. 1 may represent both transmission from one device and reception at another device.

Figure 2:
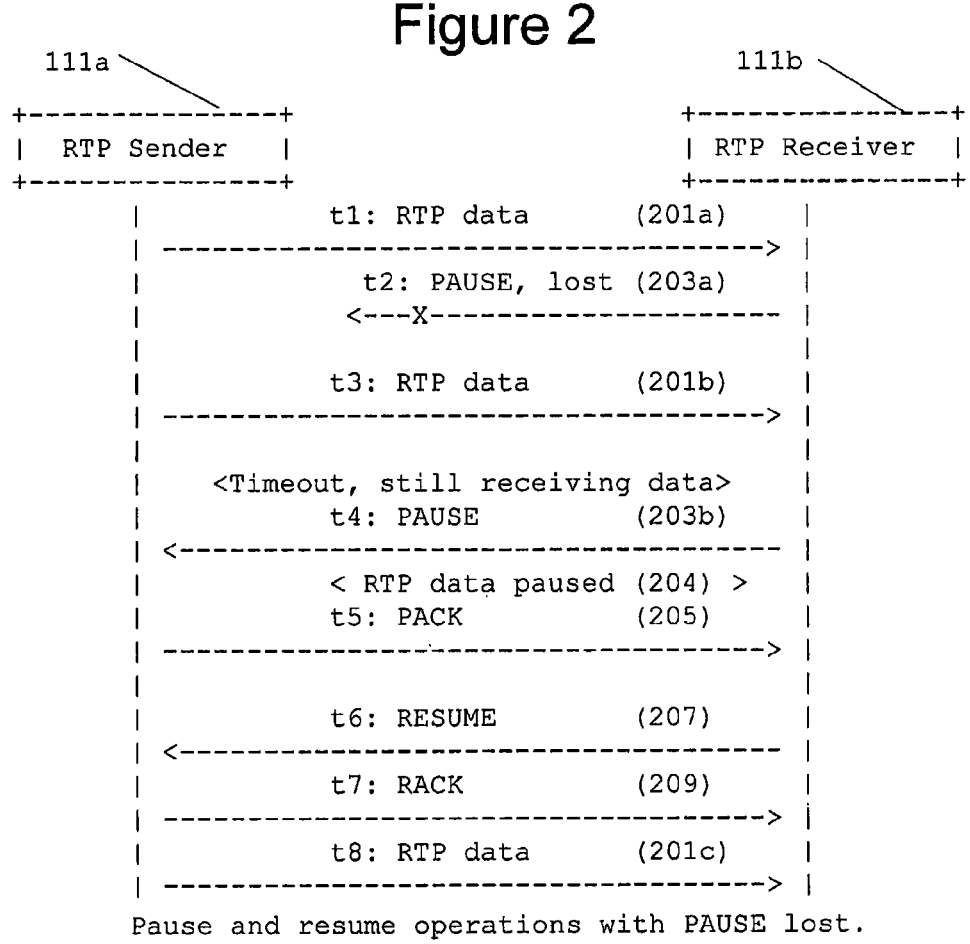

FIG. 2 shows what may happen if a PAUSE message from RTP receiver endpoint device 111b does not reach RTP sender endpoint device 111a (i.e., if a PAUSE message is lost). At time t1, sender endpoint device 111a may transmit (operation 201a) a data stream to receiver endpoint device 111b that receives the data stream. After receiver endpoint device 111b sends a PAUSE request at time t2 (operation 203a), receiver endpoint device 111b may wait for a time-out value (this time-out value may be in accordance with RTCP timing rules of RFC 3550, cited above) to detect if sender endpoint device 111a has paused the data stream transmission and/or if sender endpoint device 111a has replied with an acknowledgement according to rules discussed above (e.g., with a NACK, PACK, RACK, and/or REFUSE). If the time-out value passes/expires without a pause of the data transmission and without receiving an acknowledgement, the PAUSE message may be assumed to have been lost (i.e., not received at sender endpoint device 111a), and the RTP data stream may continue to reach to receiver endpoint device 111b at time t3 (operation 201b). Responsive to the timer expiring without receipt of an acknowledgement and without a pause of the data stream (e.g., after passage of the time-out value), receiver endpoint device 111b may retransmit the PAUSE message at time t4 (operation 203b). If the second PAUSE message reaches RTP sender endpoint device 111a, sender endpoint device 111a pauses/stops transmitting the data stream (operation 204) and replies by transmitting (operation 205) a PACK message at time t5 to receiver endpoint device 111b where the PACK message is received.

The same rules may apply for the RESUME message transmitted from receiver endpoint device 111b at time t6 (operation 207) to sender endpoint device 111a, so that the RTP receiver endpoint device 111b waits for a time-out value after sending the RESUME message until it receives a RACK acknowledgement at time t7 (operation 209) or until it begins receiving the resumed data stream transmitted from the sending endpoint device 111a at time t8 (operation 201c). If the receiver endpoint device 111b does not receive the data stream (operation 201e) or a RACK acknowledgement (operation 209) from the sender endpoint device 111a within the time-out from sending the RESUME message, receiver endpoint device 111b may retransmit the RESUME message. As discussed above with respect to FIG. 1, numbered operations of FIG. 2 may represent both transmission from one device and reception at another device.

Figure 3:
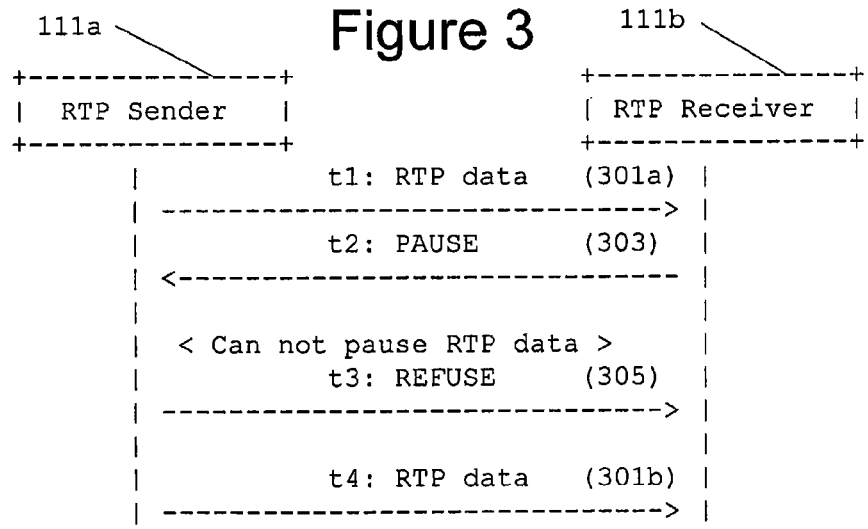

In FIG. 3, a pause request is refused in a Point-to-Point embodiment. More particularly, sender endpoint device 111a may transmit a data stream at time t1 (operation 301a), and receiver endpoint device 111b may transmit a PAUSE message to the sender endpoint device at time t2 (operation 303) to pause transmission of the data stream from sender endpoint device 111a. Responsive to sender endpoint device 111a refusing to pause (e.g., due to session policy), sender endpoint device 111a may respond with a REFUSE message at time t3 (operation 305), and the sender endpoint device 111a may continue transmitting the data stream at time t4 (operation 301b) without interruption. As discussed above with respect to FIGS. 1 and 2, numbered operations of FIG. 3 may represent both transmission from one device and reception at another device.

Point-to-Multipoint Using Mixer:

An RTP mixer is an intermediate communication node 115 connecting two transport-level clouds. A mixer receives the data streams from different RTP participant endpoint devices 111 acting as sender endpoint devices. The mixer then combines the data streams, for example, using a base of logic defined in Section 7.3 of RFC 3550, cited above. The data streams may then be forwarded/sent (individually or in combination) to different ones of participant endpoint devices 111 acting as receiver endpoint devices. The mixer may provide its own SSRC in RTP data packets for the forwarded data stream or streams instead of original source SSRC(s) from the respective sending endpoint devices.

The mixer may keep track of all the receiver endpoint devices which pause and resume a particular data stream from a particular sender endpoint device. The mixer may act as a bridge between the sender and receiver endpoint devices. The mixer may not pause any source (i.e., sender endpoint device) until no receiver endpoint device is ready to receive the data stream from that source (i.e., when pause requests have been received from all participant endpoint devices in the session other than the source of the data strewn). On the other hand, the mixer may request that a PAUSED sender endpoint device resume transmitting its data stream as soon as any of the receiver endpoint devices transmits a RESUME request to request reception of that data stream.

Figure 4:
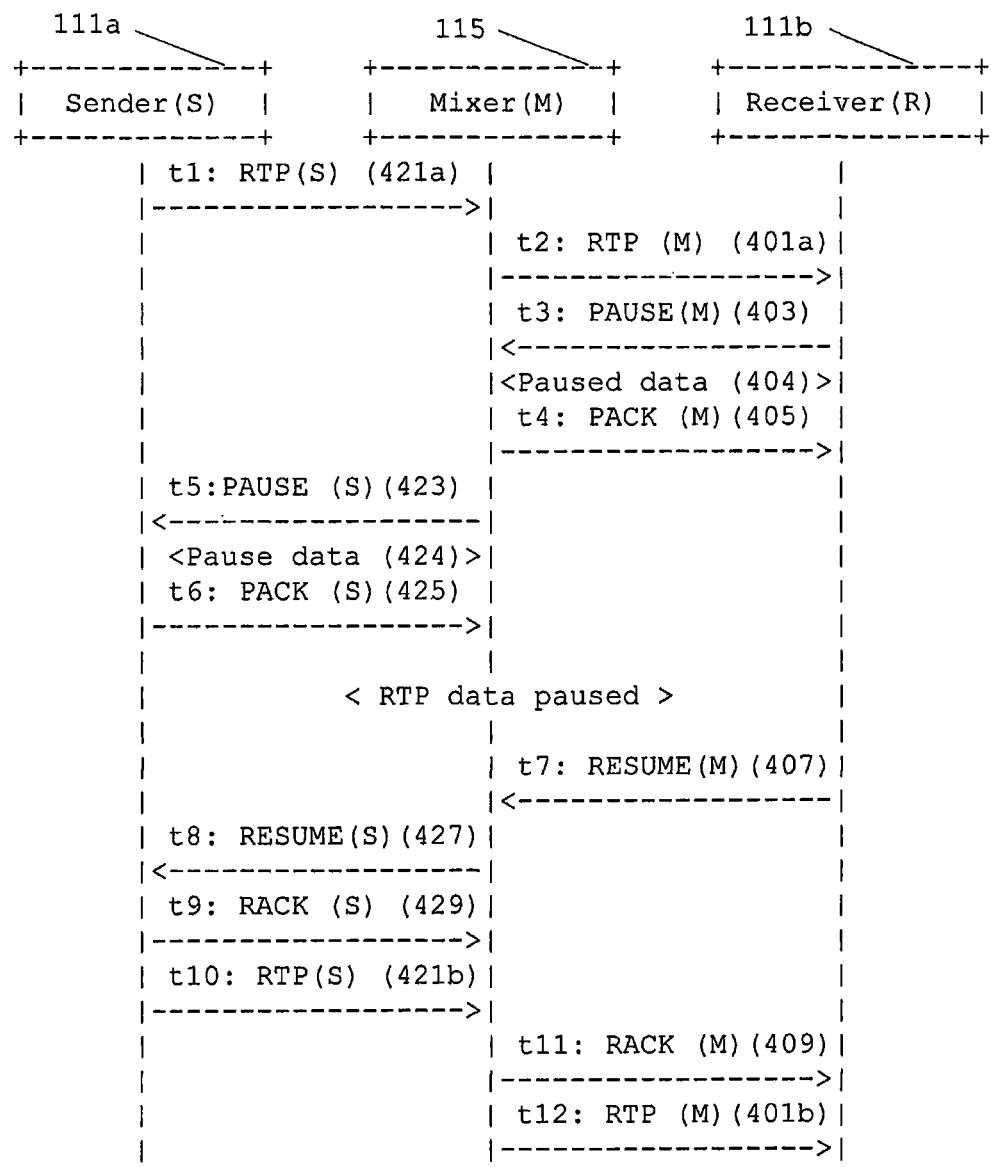

FIG. 4 shows pause and resume RTP data reception when a communication node 115 is implemented as a mixer between sender and receiver endpoint devices 111a and 111b. The SSRCs of sender endpoint device 111a, communication node (mixer) 115, and receiver endpoint device 111b are represented by S, M, and R respectively. RTP sender endpoint device 111a sends a data stream through communication node (mixer) 115 to the receiver endpoint device 111b at times t1 and t2 (operations 421a and 401a). More particularly, sender endpoint device 111a transmits the data stream and corm node 115 receives the data stream at time t1 (operation 421a) using SSRC S of sender endpoint device 111a in packets of the data stream. Then, communication node 115 transmits/forwards the data stream and receiver endpoint device receives the data stream at time t2 (operation 401a) using SSRC M of communication node 115 in packets of the data stream. Sender endpoint device 111a sends the data stream with its SSRC (S) assigned to packets of the data stream, and communication node (mixer) 115 forwards the RTP data stream by assigning its own SSRC (M) to the packets of the data stream.

At time t3, receiver endpoint device 111b transmits a PAUSE request (to pause the data stream transmission from sender endpoint device 111a) with the PAUSE request including the SSRC (NI) of communication node (mixer) 115 (operation 403), and the PAUSE request may be received at communication node (mixer) 115. Responsive to receiving the PAUSE request at communication node (mixer) 115 at time 14, communication node 115 (e.g., a mixer) may pause transmission of the data stream to the receiver endpoint device 111b (operation 404) and may also transmit a PACK message with the SSRC (M) of communication node 115 (e.g., a mixer) to the receiver endpoint device 111b (operation 405) where the PACK message is received. At time t5, communication node (mixer) 115 may forward the PAUSE request with the SSRC (S) of sender endpoint device 111a to sender endpoint device 111a (operation 423) where the PAUSE request is received. Because there is no other receiver endpoint device corresponding to sender endpoint device 111a in the session, upon receiving the PAUSE request at sender endpoint device 111a (operation 423), sender endpoint device 111a may immediately pause the RTP data stream (operation 424) and reply by transmitting a PACK including the SSRC (S) of the sender endpoint device 111a to communication node (mixer) 115 at time t6 (operation 425). At time t7, receiver endpoint device 111b may transmit a RESUME request (operation 407) including the SSRC (M) of the communication node (mixer) 115 to communication node (mixer) 115 for sender endpoint device 111a to resume the data stream. At time t8, communication node (mixer) 115 may forward the RESUME request including the SSRC (S) of sender endpoint device 111a to sender endpoint device 111a (operation 427). At time t9, sender endpoint device 111a may reply with a RACK message including the SSRC (S) to communication node (mixer) 115 so that the RACK message is transmitted from sender endpoint device 111a to communication node (mixer) 115. At time t10, sender endpoint device 111a may resume transmitting (421b) the data stream (421b) to communication (node) node 115 with packets of the data stream including the SSRC (S) of sender endpoint device 111a. Responsive to receiving the RACK message (including the SSRC (S)) at time t11, communication node (mixer) 115 may respond (operation 409) to receiver endpoint device 111b by transmitting a RACK message including the SSRC (M) that is received at receiver endpoint device 111b. At time 111, communication node (mixer) 115 starts forwarding (operation 401b) the data stream from the sender endpoint device 111a with the data packets of the data stream including the SSRC (M). As discussed above with respect to FIGS. 1, 2, and 3, numbered operations of FIG. 4 may represent both transmission from one device and reception at another device.

FIG. 5 illustrates a communication node 115 implemented as a mixer performing pause and resume operations between a sender endpoint device 111a and two receiver endpoint devices 111b and 111c, where S is the SSRC of the sender endpoint device 111a, M is the SSRC of the communication node (mixer) 115, R1 is the SSRC of the first receiver endpoint device 111b, and R2 is the SSRC of the second receiver endpoint device 111c. At time t1, the sender endpoint device 111a sends (operation 521a) an RTP data stream to communication node (mixer) 115 for retransmission to receiver endpoint devices 111b and 111c, with data packets of the data stream including the SSRC (S) of the sender endpoint device 111a. Communication node (mixer) 115 forwards the data stream to receiver endpoint devices 111b and 111c (operations 501a and 511a) at time 12 with the data packets including the SSRC (M) of the communication node (mixer) 115. Receiver endpoint device 111b transmits (operation 503) a PAUSE request with the SSRC (M) of the communication node (mixer) 115 to communication node (mixer) 115 at time t3 to pause the data stream from the sender endpoint device 111a. Communication node (mixer) 115 replies (operation 505) with a PACK at time t4 and stops forwarding (operation 504) the data stream from sender endpoint device 111a to receiver endpoint device 111b, but communication node (mixer) 115 continues forwarding (operation 511b) the data stream from sender endpoint device 111a to receiver endpoint device 111c at time t5.

After some time (at time t6), receiver endpoint device 111c sends (operation 513) a PAUSE request including the SSRC (M) of the communication node (mixer) 115 to the commendation node (mixer) 115. At time t7, communication node (mixer) 115 replies (operation 515) with a PACK message and stops forwarding (operation 514) the data stream from sender endpoint device 111a to receiver endpoint device 111c. Communication node (mixer) 115 may now recognize that no receiver endpoint device is receiving the data stream from sender endpoint device 111a, and the communication node (mixer) 115 may transmit a PAUSE message (operation 523) including the SSRC (S) of the sender endpoint device 111a to the sender endpoint device 111a at time t8 to pause the actual source of the data stream. Sender endpoint device 111a may respond with a PACK message (operation 525) at time t9 including the SSRC (S) of sender endpoint device 111a, and sender endpoint device 111a may pause transmitting the data stream (operation 524) to communication node (mixer) 115.

At time t10, receiver endpoint device 111b may transmit a RESUME request (operation 507) including the SSRC (M) of the communication node (mixer) 115 to the communication node (mixer) 115 to resume receiving the data stream from sender endpoint device 111a, and communication node (mixer) 115 may forward the RESUME request (operation 527) including the SSRC (S) of sender endpoint device 111a to sender endpoint device 111a at time t11. In response, sender endpoint device 111a may respond with a RACK message (operation 529) including the SSRC (S) of the sender endpoint device 111a to the communication node (mixer) 115 at time t12, and communication node (mixer) 115 may forward that RACK message (operation 509) including the SSRC (M) of communication node (mixer) 115 to receiver endpoint device 111b at time t13. Sender endpoint device 111a may resume transmitting the data stream (operation 521b) at time t14 with packets of the data stream including the SSRC (S) of sender endpoint device 111a, and communication node (mixer) 115 may forward the data stream (operation 501b) from sender endpoint device 111a to receiver endpoint device 111b at time t15 with packets of the data stream including the SSRC (M) of communication node (mixer) 115. Similar operations may be performed at times t16, t17, and 118 (operations 517, 519, and 511c) to resume streaming to receiver endpoint device 111c. Because sender endpoint device 111a is already transmitting the data stream to communication node (mixer) 115 beginning at time t15, however, data stream transmission from communication node (mixer) 115 to receiver endpoint device 111c may be resumed without requiring further RESUME requests and/or Rack responses between sender endpoint device 111a and communication node (mixer) 115. As discussed above with respect to FIGS. 1, 2, 3, and 4, numbered operations of FIG. 5 may represent both transmission from one device and reception at another device.

When an RTP session has one or more paused sender endpoint device(s), and a new participant joins the conference with the new participant being unaware of the paused sender endpoint device(s), it may be the responsibility of communication node (mixer) 115 to send a RESUME request to the paused sender endpoint device(s) so that the RTP stream(s) may reach to the newly joined receiver endpoint device. Then, it may depend on the now receiver endpoint device in the session either to PAUSE or continue to receive that stream.

Point-to-Multipoint Using Translator:

In some embodiments, communication node 115 may be implemented as a translator in an RTP communication session to forward messages from one peer end point device to another. Unlike sessions using a mixer, however, a translator does not mix the streams and does not change the SSRC of messages/packets.

FIG. 6 illustrates use of a translator as communication node 115 to help receiver endpoint device 111b pause and resume a data stream from sender endpoint device 111a. Sender endpoint device 111a may transmit an RTP data stream (operation 621a) to communication node (translator) 115 at time t1, and communication node (translator) 115 just forwards the data stream (operation 601a) without modifying the SSRCs of the data stream packets at time t2. Stated in other words, the data packets of the data stream are transmitted with the SSRC (S) of sender endpoint device 111a from both sender endpoint device 111a and from communication node (translator) 115 at times t1 and t2. Receiver endpoint device 111b may send a PAUSE request (operation 603) to communication node (translator) 115 at time t3, and communication node (translator) 115 forwards the PAUSE request (operation 623) to sender endpoint device 111a at time t4. The PAUSE request is transmitted from both receiver endpoint device 111b and from communication node (translator) 115 with the SSRC (S) of sender endpoint device 111a. Sender endpoint device 111a may confirm that there is no other receiver endpoint device(s) which wants to receive the data stream before pausing the data stream (operation 624), and responsive to confirming that no other receiver endpoint devices are receiving the data stream, sender endpoint device 111a may transmitting a PACK message (operation 625) to communication node (translator) 115 at time t5. Responsive to receiving the PACK message, communication node (translator) 115 may forward (operation 605) the PACK message (including the SSRC (S) of sender endpoint device 111a) to receiver endpoint device 111b at time t6. As shown in FIG. 6, the PACK message is transmitted with the SSRC (S) of the sender endpoint device from both sender endpoint device 111a and communication node (translator) 115.

Receiver endpoint device 111b may initiate resuming the data stream from sender endpoint device 111a by transmitting a RESUME request (operation 607) to communication node (translator) 115 at time t7, and communication node (translator) 115 may forward the RESUME request (operation 627) to sender endpoint device 111a at time t8. The RESUME request may include the SSRC (S) of sender endpoint device 111a when transmitted by both receiver endpoint device 111b and communication node (translator) 115. In response, sender endpoint device 111a may transmit a RACK message (operation 629) to communication node (translator) 115 at time t9, and communication node (translator) 115 may forward the RACK message (operation 609) to receiver endpoint device 111b at time t10. The RACK message may include the SSRC (S) of sender endpoint device 111a when transmitted by both sender endpoint device 111a and communication node (translator) 115. Moreover, sender endpoint device 111a may resume transmitting the RTP data stream (operation 621b) to communication node (translator) 115 at time t11, and communication node (translator) 115 may forward the RTP data stream (operation 601b) to receiver endpoint device 111b at time t12. Packets of the data stream may include the SSRC (S) of sender endpoint device 111a when transmitted by both sender endpoint device 111a and communication node (translator) 115.

As discussed above with respect to FIGS. 1, 2, 3, 4, and 5, numbered operations of FIG. 6 may represent both transmission from one device and reception at another device.

Figure 7:
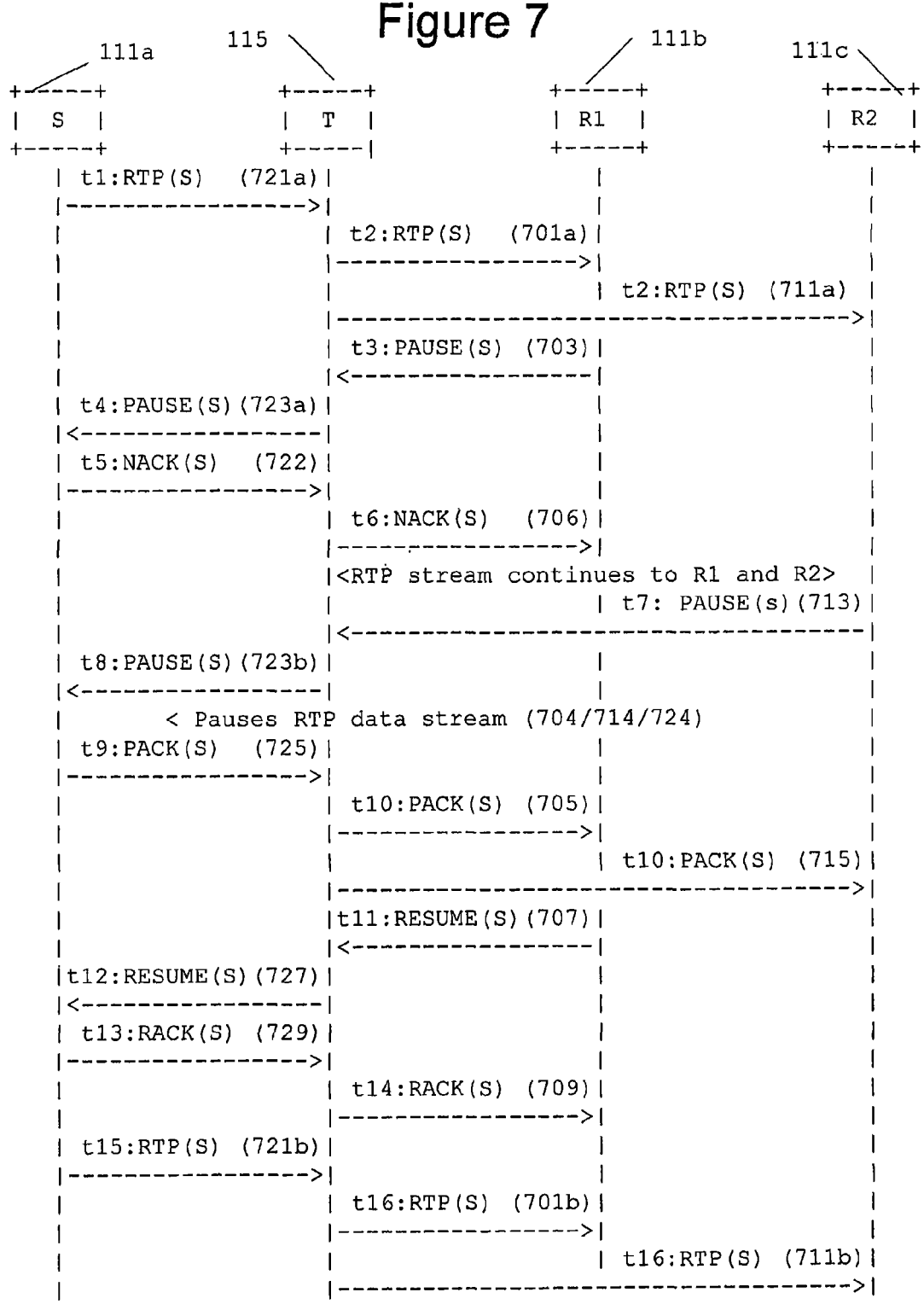

FIG. 7 illustrates pause and resume operations when communication node 115 is implemented as a translator between a sender endpoint device 111a and two receiver endpoint devices 111b and 111c in an RTP communication session. Each message exchange is represented by a time (e.g., t1 to t16) that it occurs. At time t1, sender endpoint device 111a initiates data streaming (operation 721a) to both receiver endpoint devices R1 and R2 by transmitting packets of the data stream to communication node (translator) 115. At time t2, communication node (translator) 115 forwards packets of the data stream (operations 701a and 711a) to receiver endpoint devices 111b and 111c. Moreover, sender endpoint device 111a and communication node (translator) 115 both transmit packets of the data stream including the SSRC (S) of sender endpoint device 111a.

Receiver endpoint devices 111b and 111c receive the RTP data stream (operations 701a and 711a) from communication node (translator) 115 at time t2 with data packets of the data stream including the SSRC (S) of sender endpoint device 111a. After some time at t3, receiver endpoint device R1 may initiate pausing the data stream by transmitting a PAUSE request (operation 703) including the SSRC (S) of sender endpoint device 111a to communication node (translator) 115, and communication node (translator) 115 may forward the PAUSE request (operation 723a) including the SSRC (S) to sender endpoint device 111a at time t4. Responsive to receiving the PAUSE request from receiver endpoint device 111b (operation 723a) through communication node (translator) 115 at times t3 and t4, sender endpoint device 111a checks if there is any other receiver endpoint device(s) which still wants to receive the data stream. At this time, sender endpoint device 111a may realize that receiver endpoint device 111c is still interested in receiving the data stream, and responsive to determining that another receiver endpoint device(s) is receiving the data stream, sender endpoint device 111a may reply with a NACK message (operation 722) that is transmitted to communication node (translator) 115 at time t5, and communication node (translator) 115 may forward the MACK message (operation 706) to receiver endpoint device 111b at time t6. Moreover, the NACK message is transmitted with the SSRC (S) between sender endpoint device 111a and communication node (translator) 115 and between communication node (translator) 115 and receiver endpoint device 111b. Accordingly, sender endpoint device 111a may continue transmitting the data stream for the benefit of receiver endpoint device 111c.

At time t7, receiver endpoint device 111c may initiate pausing the data stream by sending a PAUSE request (operation 713) to communication node (translator) 115, and communication node (translator) 115 may forwarded the PAUSE request (operation 723b) to sender endpoint device 111a at time t8. This PAUSE request includes the SSRC (S) when transmitted from receiver endpoint device 111c to communication node (translator) 115 and when transmitted from communication node (translator) 115 to sender endpoint device 111a. Sender endpoint device 111a may now recognize that both/all receiver endpoint devices 111b and 111e of the session have requested that the data steam be paused, and responsive to this recognition, sender endpoint device 111a may pause transmitting the data stream (operation 704/714/724).

Sender endpoint device 111a can thus stop sending the data stream and reply by transmitting a PACK message (operation 725) to communication node (translator) 115 at time t9. Communication node (translator) 115 can then forward the PACK message (operations 705 and 715) to both receiver endpoint devices 111b and 111c at time t10. The Pack message may include the SSRC (S) when transmitted from sender endpoint device 111a to communication node (translator) 115 and when transmitted from communication node (translator) 115 to each of the receiver endpoint devices 111b and 111c.

When any of receiver endpoint devices 111b and/or 111c opts to resume the data stream from sender endpoint device, it may send a RESUME request through communication node (translator) 115 to sender endpoint device 111a (at times t11 and t12). In response to such a RESUME request, sender endpoint device 111a may transmit a RACK message through communication node (translator) 115 to the requesting receiver endpoint device(s) 111a and/or 111b at times t13 and t14, and may resume data streaming through communication node (translator) 115 to receiver endpoint devices 111b and 111c at times t15 and t16. More particularly, receiver endpoint device 111b may transmit a RESUME message (operation 707) to communication node (translator) 115 at time t11, and communication node (translator) 115 may forward the RESUME message (operation 727) to sender endpoint device 111a at time t12. Responsive to the RESUME message, sender endpoint device 111a may transmit a RACK message (operation 729) to communication node (translator) 115 at time t13, and communication node (translator) 115 may forward the RACK message (operation 709) to receiver endpoint device 111b at time t14. Responsive to the RESUME message from one of the receiver endpoint devices of the session, sender endpoint device 111a may also resume transmitting the data stream (operation 721b) to communication node (translator) 115, and communication node (translator) 115 may forward the data stream (operations 701b and 711b) to all receiver endpoint devices 111b and 111c of the session at time t16.

As discussed above with respect to FIGS. 1, 2, 3, 4, 5, and 6, numbered operations of FIG. 7 may represent both transmission from one device and reception at another device.

Consider an RTP session which includes one or more receiver endpoint devices (e.g., 111b and 111e), paused sender endpoint device(s) 111a, and communication node (translator) 115. If a new participant (i.e., a new receiver endpoint device) joins the session, the new participant may be unaware of the paused sender endpoint device 111a. On receiving knowledge of such a newly joined participant in the session (e.g., on receiving any RTP traffic and/or any RTCP report such as an SR or RR report) from the newly joined participant, the paused sender endpoint device 111a may resume transmission of the data stream because there is now a receiver endpoint device in the session that did not pause the data stream generated by sender endpoint device 111a. Sender endpoint device 111a may subsequently pause transmitting the data stream if the new receiver endpoint device transmits a PAUSE request while all other receiver endpoint devices are paused.

Point-to-Multipoint Using Multicast:

An RTP receiver endpoint device may pause multiple sender endpoint devices using multicasting. Embodiments of this disclosure may use elements, structures, and/or operations of RTP (see, RFC 3550, cited above), AVPF (Audio-Visual Profile With Feedback) (see, RFC 4585, cited above), and/or the CCM (Codec Control Message) (see, RFC 5104, cited above) for multicasting. The behavior of sender and receiver endpoint devices on sending and receiving PAUSE and RESUME messages may remain the same as discussed in the sections "Point-To-Multipoint Using Mixer" and "Point-to-Point Using Translator".

SDP Definitions:

The capability of handling PAUSE and RESUME messages may be exchanged at a high layer such as SDP (Session Description Protocol). Embodiments of this disclosure may extend rtcp-fb (real-time transport control protocol feedback) attributes defined in section 4 of AVPF (see, RFC 4585, cited above) to include PAUSE and RESUME requests. Like AVPF (see, RFC 4585, cited above) and CCM (see, RFC 5104, cited above), embodiments of this disclosure may use rtcp-fb attributes at media level and may/must not be used at session level. Embodiments of this disclosure may follow all the rules defined in AVPF (see, RFC 4585, cited above) for rtcp-fb attributes relating to payload type in a session description.

Section 7.1 of CCM (see, RFC 5104, cited above) defines a new feedback value "cm", which indicates the support of codec control using RTCP feedback. The CCM (see, RFC 5104, cited above) defines four different parameters which may/should be used with the feedback value "ccm" to indicate the specific codec control command. Embodiments of the present disclosure define a new parameter type, i.e., "pause", which may aggregately represent the PAUSE and RESUME messages and their acknowledgements (i.e., PACK, NACK, RACK and REFUSE). For example, to show the support for pausing and resuming the stream, an RTP receiver may describe its capability to deal with PAUSE and RESUME messages.

The following SDP formats (representing pause and resume capabilities) may be used according to some embodiments of the present invention.

v=0
o=alice 3203093520 3203093520 IN IP4 host.example-
  .com
s=Pausing Media
t=0 0
c=IN IP4 host.example.com
m=audio 49170 RTP/AVPF 98
a=rtpmap:98 H263-1998/90000
a=rtcp-fb:98 ccm pause Message Format:

Section 6 of RFC 4585 (AVPF) (cited above) defines three types of low-delay RTCP feedback messages (i.e., Transport layer, Payload-specific, and Application layer feedback messages). Embodiments of the present disclosure define two Transport layer feedback messages (i.e., PAUSE and RESUME messages) to pause and resume an RTP data stream respectively and four different types of acknowledgements for use in response to either PAUSE or RESUME requests.

The Transport layer feedback messages may be identified by RTP (Real-time Transport Protocol) FB (Feedback) in RFC 4585, cited above. The new PAUSE and RESUME messages may be identified using a Feedback Message Type (FMT) value in common packet header for a feedback message defined in section 6.1 of RFC 4585, cited above. The IANA may be requested to allocate one number of Feedback Message Type (FMT) in a common feedback message header to pause and resume RTP media data streams. From the top-level, the PAUSE and RESUME requests and their acknowledgement messages may aggregately be referred to as "pause messages" and may be identified by payload type (PI), with PT=RTPFB hi common packet format for feedback messages. The Feedback Control information (FCI) field may/shall consist of one or more of a PAUSE request, a RESUME request, and/or an acknowledgement message(s) for a PAUSE/RESUME request.

The feedback message format of FIG. 8 may be used as a syntax of an FCI (Feedback Control Information) Entry for PAUSE and RESUME messages according to some embodiments of the present invention.

SSRC to Apply (32 bits): The SSRC value of media sender on which this feedback message may/shall be applied. The SSRC uniquely identifies the source of a data stream within an RTP communication session.

Sequence Number (16 bits): Sequence number of feedback requests (e.g., PAUSE and RESUME requests) which may/shall be incremented by one after each transmission. Both PAUSE and RESUME requests from a same source endpoint device may/shall SHALL share the same sequence number space. Stated in other words, sequence numbers for each PAUSE/RESUME request from a receiver endpoint device may be incremented relative to a sequence number of the previous PAUSE/RESUME request transmitted from the same receiver endpoint device. By way of example, if a same receiver endpoint device transmits a first PAUSE message, a second PAUSE message, a first RESUME message, a third PAUSE message, and a second RESUME message (in that order with no intervening PAUSE or RESUME messages), the first PAUSE message may have a sequence number x, the second PAUSE message may have a sequence number x+1, the first RESUME message may have a sequence number x+2, the third PAUSE message may have a sequence number x+3, and the second RESUME message may have a sequence number x+4.

Type (4 bits): The feedback type, e.g., either PAUSE or RESUME. The values may be provided as follows,
  0: PAUSE message
  1: RESUME message
  2: Pause-Acknowledgement (PACK)
  3: Resume-Acknowledgement (RACK)
  4: NACK: Negative-Acknowledgement (NACK)
  5: REFUSE that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block/operation of the flowcharts, flow diagrams, and/or block diagrams may be separated into multiple blocks/operations and/or the functionality of two or more blocks/operations of the flowcharts, flow diagrams, and/or block diagrams may be at least partially integrated. Finally, other blocks/operations may be added/inserted between the blocks/operations that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of the invention will be or become apparent to one with skill in the art upon review of the present drawings and description. It is intended that all such additional network elements, devices, and/or methods be included within this description, be within the scope of the present invention, and be protected by the accompanying claims. Moreover, it is intended that all embodiments disclosed herein can be implemented separately or combined in any way and/or combination.

That which is claimed is:

1. A method of operating a receiver communication device during a real time multiparty conferencing session with another communication device, the method comprising:
receiving a real time media content data stream of the real time multiparty conferencing session from the other communication device wherein packets of the real time media content data stream of the real time multiparty conferencing session include a synchronization source (SSRC) that identifies the real time media content data stream of the real time multiparty conferencing session; and
transmitting a pause request from the receiver communication device to the other communication device wherein the pause request includes the SSRC that identifies the real time media content data stream of the real time multiparty conferencing session and a pause request sequence number.

2. The method according to claim 1 further comprising:
after transmitting the pause request, receiving a pause acknowledge message from the other communication device wherein the pause acknowledge message includes the SSRC that identifies the real time media content data stream of the real time multiparty conferencing session and the pause request sequence number.

3. The method according to claim 2 further comprising:
after receiving the pause acknowledge message, transmitting a resume request from the receiver communication device to the other communication device wherein the resume request includes the SSRC that identifies the real time media content data stream of the real time multiparty conferencing session.

4. The method according to claim 1 wherein transmitting the pause request comprises transmitting a first pause request, the method further comprising:
responsive to expiration of a time out after transmitting the first pause request from the receiver communication device, transmitting a second pause request from the receiver communication device to the other communication device wherein the second pause request includes the SSRC that identifies the real time media content data stream of the real time multiparty conferencing session; and
after transmitting the second pause request, receiving a pause acknowledge message from the other communication device wherein the pause acknowledge message includes the SSRC that identifies the real time media content data stream of the real time multiparty conferencing session.

5. The method according to claim 1 wherein the real time multiparty conferencing session comprises a real time multiparty video conferencing session.

6. A method of operating a sender communication device during a real time multiparty conferencing session with another communication device, the method comprising:
transmitting a real time media content data stream of the real time multiparty conferencing session from the sender communication device to first and second receiver communication devices wherein packets of the real time media content data stream of the real time multiparty conferencing session include a synchronization source (SSRC) that identifies the real time media content data stream of the real time multiparty conferencing session; and receiving a pause request from the first receiver communication device wherein the pause request includes the SSRC that identifies the real time media content data stream of the real time multiparty conferencing session and a pause request sequence number.

7. The method according to claim 6 further comprising:
responsive to receiving the pause request, pausing transmission of the real time media content data stream of the real time multiparty conferencing session to the first receiver communication device while maintaining the real time multiparty conferencing session; and
responsive to receiving the pause request, transmitting a pause acknowledge message to the first receiver communication device wherein the pause acknowledge message includes the SSRC that identifies the real time media content data stream of the real time multiparty conferencing session and the pause request sequence number.

8. The method according to claim 7 further comprising:
after transmitting the pause acknowledge message, receiving a resume request from the first receiver communication device wherein the resume request includes the SSRC that identifies the real time media content data stream of the real time multiparty conferencing session;
responsive to receiving the resume request, resuming transmission of the real time media content data stream of the real time multiparty conferencing session to the first receiver communication device.

9. The method according to claim 6 further comprising:
responsive to receiving the pause request, transmitting a refuse message to the first receiver communication device—while continuing transmitting the real time media content data stream of the real time multiparty conferencing session to the first receiver communication device, wherein the refuse message includes the SSRC that identifies the real time media content data stream of the real time multiparty conferencing session.

10. The method according to claim 6, the method further comprising:
responsive to receiving the pause request from the first receiver communication device, pausing transmission of the real time media content data stream of the real time multiparty conferencing session to the first receiver communication device while continuing transmission of the real time media content data stream of the real time multiparty conferencing session to the second receiver communication device.

11. The method according to claim 10, wherein the pause request is a first pause request and the pause request sequence number is a first pause request sequence number, the method further comprising:
responsive to receiving the pause request from the first receiver communication device, transmitting a first pause acknowledge message to the first receiver communication device while continuing transmission of the real time media content data stream of the real time multiparty conferencing session to the second receiver communication device, wherein the pause acknowledge message includes the SSRC that identifies the real time media content data stream of the real time multiparty conferencing session; and
after transmitting the first pause acknowledgment message, receiving a second pause request from the second receiver communication device wherein the second pause request includes the SSRC that identifies the real time media content data stream of the real time multiparty conferencing session; and
responsive to receiving the second pause request from the second receiver communication device, pausing transmission of the real time media content data stream of the real time multiparty conferencing session to the second receiver communication device.

12. The method according to claim 11, wherein transmitting the real time media content data stream comprises receiving the real time media content data stream from an endpoint communication device and retransmitting the real time media content data stream to the first and second receiver communication devices, the method further comprising:
responsive to receiving the first and second pause requests from the first and second receiver communication devices, transmitting a third pause request to the endpoint communication device.

13. The method according to claim 12, wherein the SSRC comprises a first identification of the real time media content data stream of the real time multiparty conferencing session, wherein receiving the real time media content data stream from the endpoint communication device comprises receiving the real time media content data stream including a second SSRC, wherein the third pause request includes the second SSRC.

14. The method according to claim 6 wherein the real time multiparty conferencing session comprises a real time multiparty video conferencing session.

15. A receiver communication device comprising:
a network interface configured to provide network communications over a network with another communication device during a real time real time multiparty conferencing session; and
a processor coupled to the network interface, wherein the processor is configured to receive a real time media content data stream of the real time real time multiparty conferencing session from the other communication device through the network interface with packets of the real time media content data stream of the real time multiparty conferencing session including a synchronization source (SSRC) that identifies the real time media content data stream of the real time multiparty conferencing session, and to transmit a pause request through the network interface to the other communication device with the pause request including the SSRC that identifies the real time media content data stream of the real time multiparty conferencing session and a pause request sequence number.

16. The receiver communication device according to claim 15 wherein the processor is further configured to receive a pause acknowledge message from the other communication device after transmitting the pause request, wherein the pause acknowledge message includes the SSRC that identifies the real time media content data stream of the real time multiparty conferencing session and the pause request sequence number.

17. The receiver communication device according to claim 16 wherein the processor is further configured to transmit a resume request through the network interface to the other communication device after receiving the pause acknowledge message wherein the resume request includes the SSRC that identifies the real time media content data stream of the real time multiparty conferencing session.

18. The receiver communication device according to claim 15 wherein the real time multiparty conferencing session comprises a real time multiparty video conferencing session.

19. A sender communication device comprising:
a network interface configured to provide network communications over a network with first and second receiver communication devices during a real time real time multiparty conferencing session; and
a processor to the network interface, wherein the processor is configured to transmit a real time media content data stream of the real time multiparty conferencing session through the network interface to the first and second receiver communication devices with packets of the real time media content data stream of the real time multiparty conferencing session including a synchronization source (SSRC) that identifies the real time media content data stream of the real time multiparty conferencing session, and to receive a pause request from the first receiver communication device through the network interface with the pause request including the SSRC that identifies the real time media content data stream of the real time multiparty conferencing session and a pause request sequence number.

20. The sender communication device according to claim 19 wherein the processor is further configured to pause transmission of the real time media content data stream of the real time multiparty conferencing session to the first receiver communication device while maintaining the real time multiparty conferencing session responsive to receiving the pause request, and to transmit a pause acknowledge message to the first receiver communication device through the network interface responsive to receiving the pause request with the pause acknowledge message including the SSRC that identifies the real time media content data stream of the real time multiparty conferencing session and the pause request sequence number.

21. The sender communication device according to claim 20 wherein the processor is further configured to receive a resume request from the first receiver communication device through the network interface after transmitting the pause acknowledge message with the resume request including the SSRC that identifies the real time media content data stream of the real time multiparty conferencing session, to resume transmission of the real time media content data stream of the real time multiparty conferencing session responsive to receiving the resume request.

22. The sender communication device according to claim 19, wherein the processor is further configured to pause transmission of the real time media content data stream of the real time multiparty conferencing session to the first receiver communication device while continuing transmission of the real time media content data stream of the real time multiparty conferencing session to the second receiver communication device responsive to receiving the pause request from the first receiver communication device.

23. The sender communication device according to claim 22, wherein the pause request is a first pause request and the pause request sequence number is a first pause request sequence number, wherein the processor is further configured to,
transmit a first pause acknowledge message to the first receiver communication device while continuing transmission of the real time media content data stream of the real time multiparty conferencing session to the second receiver communication device responsive to receiving the pause request from the first receiver communication device, wherein the pause acknowledge message includes the SSRC that identifies the real time media content data stream of the real time multiparty conferencing session and the pause request sequence number,
receive a second pause request from the second receiver communication device after transmitting the first pause acknowledgment message, wherein the second pause request includes the SSRC that identifies the real time media content data stream of the real time multiparty conferencing session and a second pause request sequence number, and
pause transmission of the real time media content data stream of the real time multiparty conferencing session to the second receiver communication device responsive to receiving the second pause request from the second receiver communication device.

24. The sender communication device according to claim 23, wherein the processor is further configured to
transmit the real time media content data stream responsive receiving the real time media content data stream from an endpoint communication device, and
transmit a third pause request to the endpoint communication device responsive to receiving the first and second pause requests from the first and second receiver communication devices.

25. The sender communication device according to claim 24, wherein the SSRC comprises a first SSRC of the real time media content data stream of the real time multiparty conferencing session, wherein the processor is further configured to,
receive the real time media content data stream including a second SSRC, wherein the third pause request includes the second SSRC and a third pause request sequence number.

26. The sender communication device according to claim 19 wherein the real time multiparty conferencing session comprises a real time multiparty video conferencing session.

* * * * *